United States Patent
Cohen et al.

(10) Patent No.: US 7,437,766 B2
(45) Date of Patent: Oct. 14, 2008

(54) METHOD AND APPARATUS PROVIDING DECEPTION AND/OR ALTERED OPERATION IN AN INFORMATION SYSTEM OPERATING SYSTEM

(75) Inventors: Fred Cohen, Livermore, CA (US);
Deanna T. Rogers, Fremont, CA (US);
Vicentiu Neagoe, San Leandro, CA (US)

(73) Assignee: Sandia National Laboratories, Livermore, CA (US)

( * ) Notice: Subject to any disclaimer, the term of this patent is extended or adjusted under 35 U.S.C. 154(b) by 742 days.

(21) Appl. No.: 10/679,186

(22) Filed: Oct. 3, 2003
(Under 37 CFR 1.47)

(65) Prior Publication Data
US 2005/0076237 A1  Apr. 7, 2005

Related U.S. Application Data

(60) Provisional application No. 60/416,285, filed on Oct. 3, 2002.

(51) Int. Cl.
*H04L 29/00* (2006.01)
(52) U.S. Cl. .......... 726/26; 713/164
(58) Field of Classification Search ........... 713/164
See application file for complete search history.

(56) References Cited

U.S. PATENT DOCUMENTS

| | | | |
|---|---|---|---|
| 6,412,071 B1 * | 6/2002 | Hollander et al. | |
| 6,658,571 B1 * | 12/2003 | O'Brien et al. | |
| 6,907,533 B2 * | 6/2005 | Sorkin et al. | |
| 7,010,698 B2 * | 3/2006 | Sheymov | 713/194 |
| 7,143,288 B2 * | 11/2006 | Pham et al. | 713/165 |
| 2002/0066034 A1 * | 5/2002 | Schlossberg et al. | 713/201 |
| 2002/0099954 A1 * | 7/2002 | Kedma et al. | 713/200 |
| 2003/0120935 A1 * | 6/2003 | Teal et al. | 713/188 |

FOREIGN PATENT DOCUMENTS

WO  WO 01/37510 A2  5/2001

OTHER PUBLICATIONS

Cohen (1985) "Algorithmic Authentication of Identification." Information Age, V7, #1 (Jan. 1985), pp. 35-41.

Cohen (1992) "Operating System Protection through Program Evolution, Computers and Security". World Wide Web at http://www.all.net/books/IP/evolve.html. pp. 1-22 of 22.

Cohen (1995) "A Note on Detecting Tampering with Audit Trails, IFIP-TC11—Computers and Security". World Wide Web at http://www.all.net/books/audit/audmod.html. pp. 1-10 of 10.

Cohen (1998) "A Note on the Role of Deception in Information Protection". World Wide Web at http://www.all.net/journal/deception/deception.html. pp. 1-23 of 23.

(Continued)

*Primary Examiner*—Matthew B Smithers
(74) *Attorney, Agent, or Firm*—Quine Intellectual Property Law Group; Stephen J. LeBlanc

(57) ABSTRACT

A method and/or system and/or apparatus providing deception and/or execution alteration in an information system. In specific embodiments, deceptions and/or protections are provided by intercepting and/or modifying operation of one or more system calls of an operating system.

31 Claims, 9 Drawing Sheets

OTHER PUBLICATIONS

Cohen (2000) "Models of Practical Defenses Against Computer Viruses". World Wide Web at http://all.net/books/integ/vmodels.html. pp. 1-12 of 12.

Cohen et al. (1998) "A Preliminary Classification Scheme for Information System Threats, Attacks, and Defenses; A Cause and Effect Model; and Some Analysis Based on That Model." Located on the World Wide Web at http://all.net/journal/ntb/cause-and-effect.html. Sandia National Laboratories, Sep. 1998. 1-74 of 74.

Cohen et al. (2001) "Red Teaming Experiments with Deception Technologies". World Wide Web at http://www.all.net/journal/deception/experiments/experiments.html. pp. 1-30 of 30.

Javitz et al. (1994) "The NIDES Statistical Component Description and Justification," Annual Report, A010, Mar. 1994.

Michael (2002) "On the Response Policy of Software Decoys: Conducting Computer Based Deception in the Cyber Battlespace," Proceedings of the 26th Annual Computer Software and Applications Conference, Oxford, England, Aug. 2002.

Michael et al. (2001) "Intelligent Software Decoys," Proceedings of the Monterey Workshop on Engineering Automation for Software-Intensive Integration, Monterey, CA, Jun. 2001. pp. 178-187.

Michael et al. (2002) "Software Decoys: Intrusion, Detection and Countermeasures," Proceedings of the 2002 IEEE Workshop on Information Assurance, West Point, NY, Jun. 2002. pp. 130-138.

Michael et al. (2003) "An Experiment in Software Decoy Design," Proceedings of the IFIP 18th International Information Security Conference, Athens, Greece, May 2003. pp. 1-12 of 12.

Pomerantz (1999) "System Calls" The Linux Kernal Module Programming Guide. World Wide Web at http://www.tldp.org/LDP/lkmpg/node20.html. pp. 1-5 of 5.

Spitzner (2003) "Honeypots: Definitions and Value of Honeypots," World Wide Web at http://www.trackinghackers.com/papers/honeypots.html. pp. 1-5 of 5.

* cited by examiner

METHOD AND APPARATUS PROVIDING DECEPTION AND/OR ALTERED OPERATION IN AN INFORMATION SYSTEM OPERATING SYSTEM

CROSS REFERENCE TO RELATED APPLICATIONS

This application claims priority from provisional patent application 60/416,285 filed 3 Oct. 2002 entitled METHOD AND APPARATUS PROVIDING DECEPTION AND/OR ALTERED OPERATION IN INFORMATION SYSTEMS. This application discusses concepts in particular embodiments that are related to patent application Ser. No. 09/696,893 filed 26 Oct. 2000 entitled METHOD AND APPARATUS FOR NETWORK DECEPTION/EMULATION, which claims priority from provisional patent application 60/165,581 filed Nov. 15, 1999. This application discusses concepts in particular embodiments that are related to patent application 60/380,824 entitled METHOD AND APPARATUS FOR AN INVISIBLE ROUTER. This application discusses concepts in particular embodiments that are related to patent application A/N 10/678,609 entitled METHOD AND APPARATUS PROVIDING DECEPTION AND/OR ALTERED EXECUTION OF LOGIC IN AN INFORMATION SYSTEM filed on the same date as this application. Each of these applications and all documents referred to therein are hereby incorporated by reference.

STATEMENT REGARDING GOVERNMENT SPONSORED RESEARCH

This invention was made with Government support sponsored by the United States Department of Defense under MIPR1CDOEJG102 2112040 162-3825 P633D06 255X 633006.247.01.DD.00 JGBZZ.1 JOAN 1JG8CA. The Government has certain rights to this invention.

COMPUTER PROGRAM LISTING APPENDIX ON COMPACT DISC

Attached herewith are TWO TOTAL compact discs. These discs are identical copies. Each disc contains one file comprising a computer program listing appendix. All material therein is hereby incorporated by reference in this application. The one file on the compact disc is entitled Cohen_et_al.txt and contains example source code and difference files illustrating specific implementations of specific embodiments of the invention along with explanatory text. These compact discs were created on the filing data indicated above. These compact discs are in Microsoft ® Windows format and the file thereon is indicated as comprising 250,326 bytes.

DUPLICATE PAPER COMPUTER PROGRAM LISTING APPENDIX

Attached herewith furthermore is a duplicate paper appendix of 76 total pages. This appendix contains the same listing as on the compact disc and is furthermore fully incorporated herein by reference.

COPYRIGHT NOTICE

Pursuant to 37 C.F.R. 1.71(e), Applicants note that a portion of this disclosure contains material that is subject to copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention is related to the field of electronic circuits and/or information processing methods and/or information systems. More specifically, the present invention in various aspects is directed to methods and/or apparatus of information systems that provide deceptions or other enhanced features at an operating system level.

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

In the history of conflict, providing deceptive information to adversaries has been a cornerstone of successful offense and defense. Information protection has included such examples of deception for defense as honey pots to gain insight on attacker behavior, lightning rods to draw fire, and program evolution as a technique for defending against automated attacks on operating systems. Long before computers existed, information protection through deception was widely demonstrated, however this history also demonstrates that deception is used far more by attackers than defenders.

Protecting information systems from various forms of attack has long been of concern to practitioners in the field. Some forms of protection are built into operating systems, such as user and/or password authentication. Other forms of protection include various software and sometimes hardware strategies. A very commonly used form of protection is anti-virus software. Inventor Fred Cohen, as early as 1988, proposed and implemented an integrity shell, which was a program that run in an operating system kernel space and used a modified execution system call to verify a check sum over every program before executing that program. Such a modified system call allowed the system to protect against viruses that hid within executable components, because the presence of such viruses would change the checksum of those executable components. Further information about this work is available at http://(/)(/)all(.)net(/)books(/)integ/vmodels.html.

It is believed to be generally known to modify parts of an operating system, including parts of kernel system calls, for various reasons. In some cases, modified system calls will preserve original system calls in order to remove modifications or in order to run original system calls after the modified portion is run. For example, such techniques are discussed in "The Linux Kernel Module Programming Guide" by Ori Pomerantz, believed available 1999 May 19. (see www(.)tldp(.)org(/)LDP(/)lkmpg(/)node20.html.)

Various strategies used in computer systems have at times included providing some type of misinformation. Some logic modules, for example, are designed to hide themselves from various operating system functions, such as process viewing functions, and thus can cause functions to provide a list of processes and/or files and/or users, for example, that are not complete. One use of such a strategy is mentioned in the context of a program referred to as the Kernel Intrusion System. This program is described as a kernel level rootkit that, among other things, makes modifications to the kernel to get some privileges, and hides itself from system administrators. Further information is available at www(.) packetstormsecurity(.)org/UNIX/penetration/rootkits/kis-0.9.tar.gz.

Inventor Fred Cohen has previously proposed using deceptions in the context of networked computers to direct attackers, for example, away from a protected system and into emulation systems or other systems in a network. Such work is discussed in, inter alia, U.S. utility patent application Ser. No. 09/696,893 claiming priority from 60/165,581 and U.S. provisional patent application 60/380,824.

Though limited modifications of operating systems and limited misinformation has been previously known in information systems, generalizable and/or modifiable techniques for providing deception and/or other altered behavior at an operating system level are not available.

OTHER REFERENCES

Fred Cohen, Operating System Protection Through Program Evolution, Computers and Security 1992. (In this paper, techniques for automatically modifying programs without changing their operation are given as a method of camouflage to conceal points of attack.) all(.) net(/)books(/)IP(/)evolve.html Fred Cohen, Information System Defenses—A Preliminary Classification Scheme Computers and Security, 1997. (This paper describes almost 140 different classes of protective methods gathered from many different sources.) all(.)net(/)CID(/)Defense(/)Defense.xref Fred Cohen et. al. Model-Based Situation Anticipation and Constraint Fred Cohen, Algorithmic Authentication of Identification, Information Age, V7#1 (January 1985), pp 35-41.

Fred Cohen, A Note on Detecting Tampering with Audit Trails, IFIP-TC11, " Computers and Security', 1996 all(.)net(/)books(/)audit(/)audmod.html W. Cheswick and S. Bellovin, Firewalls and Internet Security—Repelling the Wiley Hacker Addison-Wesley, 1994.

Mikhail Auguston, J. Bret Michael, Richard Riehle, and Neil C. Rowe, "Software Decoys: Intrusion Detection and Countermeasures," Proceedings of the 2002 IEEE Workshop on Information Assurance, West Point, N.Y., June 2002. www(.)cs(.)nps(.)navy(.) mil(/)people(/)faculty(/)bmichael(/)publications.html.

Mikhail Auguston, Georgios Fragkos, and J. Bret Michael, "An Experiment in Software Decoy Design: Intrusion Detection and Countermeasures via System Call Instrumentation," Proceedings of the IFIP 18th International Information Security Conference, Athens, Greece, May 2003. www(.)cs(.)nps(.)navy(.) mil(/)people(/)faculty(/)bmichael(/)publications.html.

Fred Cohen, "A Note on the Role of Deception in Information Protection," all(.) net(/)journal(/)deception(/)deception.html, 1998.

Fred Cohen, Irwin Marin, Jeanne Sappington, Corbin Stewart, and Eric Thomas, "Red Teaming Experiments with Deception Technologies," all(.) net(/)journal(/)deception(/)experiments(/)experiments.html, November 2001.

Harold S. Javitz and Alfonso Valdes, The NIDES Statistical Component Description and Justification, Annual Report, A010, March 1994.

James Bret Michael and Richard D. Riehle, "Intelligent Software Decoys," Proceedings of the Monterey Workshop on Engineering Automation for Software-Intensive System Integration, Monterey, Calif., June 2001. www(.) cs(.)nps(.) navy.mil(/)people(/)faculty(/)bmichael(/)pubs(/)decoys-mtyworkshop2001.pdf.

James Bret Michael, "On the Response Policy of Software Decoys: Conducting Software-Based Deception in the Cyber Battlespace," Proceedings of the 26th Annual Computer Software and Applications Conference, Oxford, England, August 2002. www(.)cs(.)nps(.) nnavy.mil(/)people(/)faculty(/)bmichael(/)publications.html.

Lance Spitzner, "Honeypots: Definitions and Value of Honeypots," www(.)trackinghackers(.) com(/)papers(/)honeypots.html, May 2003.

SUMMARY OF THE INVENTION

The invention in various specific aspects and embodiments involves methods and/or systems and/or modules that provide a variety of different functions in information handling apparatus and/or methods. In various embodiments, the invention provides novel methods and/or modules useful in information systems. According to specific embodiments, methods of the invention can include one or more of: providing deceptions at an operating system level, such as through system call components; including in an operating system decision making and deception capabilities; providing deceptions and/or access control at program executions in an information system; intercepting program executions in an operating system; and other methods and modules as described herein and as will be understood to persons of skill in the art having benefit of the teachings provided herein.

Operating System Level Deceptions

In further embodiments, the invention is involved with a system and/or method to provide enhanced security or other features in an operating system and/or information system by extending, at a basic level, responses to requests for logic execution (e.g., requests for program execution or requests of system calls).

In general, previous information systems responded in one of two ways to a request for logic execution: (1) perform the requested function and provide an accurate response; or (2) deny the requested function and provide a notification of the denial. According to specific embodiments of the present invention, one or more further basic operating responses are provided at the level of an information system, such as: (3) provide a deceptive response; (4) provide no response at all; (5) redirect the request to another process or system and/or optionally provide a response from a different system; and/or (6) modify the request before executing it.

System Calls Embodiment

In specific embodiments, the invention involves methods and/or logic modules to provide deceptions and/or other functions at an operating system level of an information processing system that can be implemented within system calls of an operating system kernel. In such an embodiment, an operating system kernel is designed and/or modified so that an evaluation of requests for operating system calls is performed before those calls are executed. One or more different deceptive responses and/or one or more different deceptive actions can be provided when determined by a decision component. The decision component can reside within the kernel or within a user space or in a different processing environment, examples of which are further described herein.

In specific embodiments, this aspect of the invention is implemented through creation and/or modification of a set of system calls in a new or existing operating system, for example, by replacing existing system call logic instructions with modified or rewritten instructions. In other embodiments, systems calls are intercepted by changing addresses in a system call table to first run a system call deception module and to evaluate calls before fulfilling the requested system call.

In further embodiments, modified system calls and/or a system call module can communicate with external logic processes and/or logic devices and/or people in order to facilitate decisions regarding modifying operation of system calls.

Wrapper Embodiment

In further embodiments, the invention involves a logic module referred to herein at times as an execution wrapper (EW) or simply a wrapper. A wrapper according to specific embodiments of the invention is a logic instruction stream or module or set of modules that are run every time a request is received to execute a program in an information system. In specific embodiments, a wrapper is implemented by modifying the way an information system handles program execution requests (such as the exec() and/or related or analogous system calls) so that execution of a program is only performed when a request for that program is received from a wrapper. Program execution requests not received from a wrapper are first passed to the wrapper for evaluation. Based on the evaluation, possibly deceptive responses and/or other actions may be taken instead of, or in addition to, normal execution of the program.

According to further specific embodiments of the present invention, a wrapper executes primarily or exclusively in a user space or analogous non-system space of an operating system. It is thus more easily implemented and/or more easily modified and/or more easily made secure than modules that run within a system space or kernel space of an operating system.

Other Embodiments

In further embodiments, aspects of the invention can be embodied as improved operating systems and/or information processing systems, providing one or more of the novel features described herein. In further embodiments, methods of the invention may be performed utilizing two or more separable devices and/or modules in communication with each other.

In further embodiments, the invention involves methods and/or modules that provide a rich set of possible deception and/or emulation responses, including probabilistic and/or random deception responses or partial responses, at an operating system level of an information processing system.

In further embodiments, the invention is involved with systems and/or methods that can determine and store patterns of operation of an information processing system and can detect variations to typical patterns of operation. In response to such detecting, the invention according to specific embodiments provides responses and/or actions as described herein. In further embodiments, the invention is involved with systems and/or methods that can be used to detect certain kinds of behavior or requests at an operating system level and use those request to trigger one or more extended actions as discussed herein.

In further specific embodiments, the invention is involved with particular techniques for effectively implementing one or more of the methods and/or modules discussed herein in particular operating systems and/or families of operating systems. One type of operating system of interest, and used as examples for discussion purposes below, is a Unix or Linux type of operating system. Particular embodiments of the invention involve methods and/or modules for implementing the general methods of the invention in such an operating system. The description and claiming of these techniques is not meant to limit the broadly described methods of the invention, which can be implemented in various ways and generally in any information system that provides for execution of logic instructions external to an operating system kernel.

A further understanding of the invention can be had from the detailed discussion of specific embodiments below. For purposes of clarity, this discussion at times refers to devices, methods, and concepts in terms of specific examples, including specific examples derived from the Linux operating system. However, the method of the present invention may operate with a wide variety of types of information systems and logic systems. It is therefore intended that the invention not be limited except as provided in the attached claims. Furthermore, it is well known in the art that logic systems can include a wide variety of different components and different functions in a modular fashion. Different embodiments of a system can include different mixtures of elements and functions and may group various functions as parts of various elements. For purposes of clarity, the invention is described in terms of systems that include many different innovative components and innovative combinations of components. No inference should be taken to limit the invention to combinations containing all of the innovative components listed in any illustrative embodiment in this specification.

The invention as described herein at times refers to execution of programs and/or calling system functions, processes, requests for information, etc., in information systems. These terms should be understood as generally equivalent except where indicated herein and should be understood to encompass any method or format or paradigm for initiation and/or execution and/or running a logic fragment or logic component or instruction sequence or logic module in an information handling environment.

Software Implementations

Various embodiments of the present invention provide methods and/or systems relating to information systems that can be implemented and/or stored on a general purpose or special purpose information handling appliance using a suitable programming language such as Java, $C^{++}$, Cobol, C, $C^{\#}$, Pascal, Fortran., PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

All publications, patents, and patent applications cited herein are hereby incorporated by reference in their entirety for all purposes. The invention in specific embodiments will be further understood with reference to the following drawings and detailed description.

DESCRIPTION OF SPECIFIC EMBODIMENTS

Figure 1:
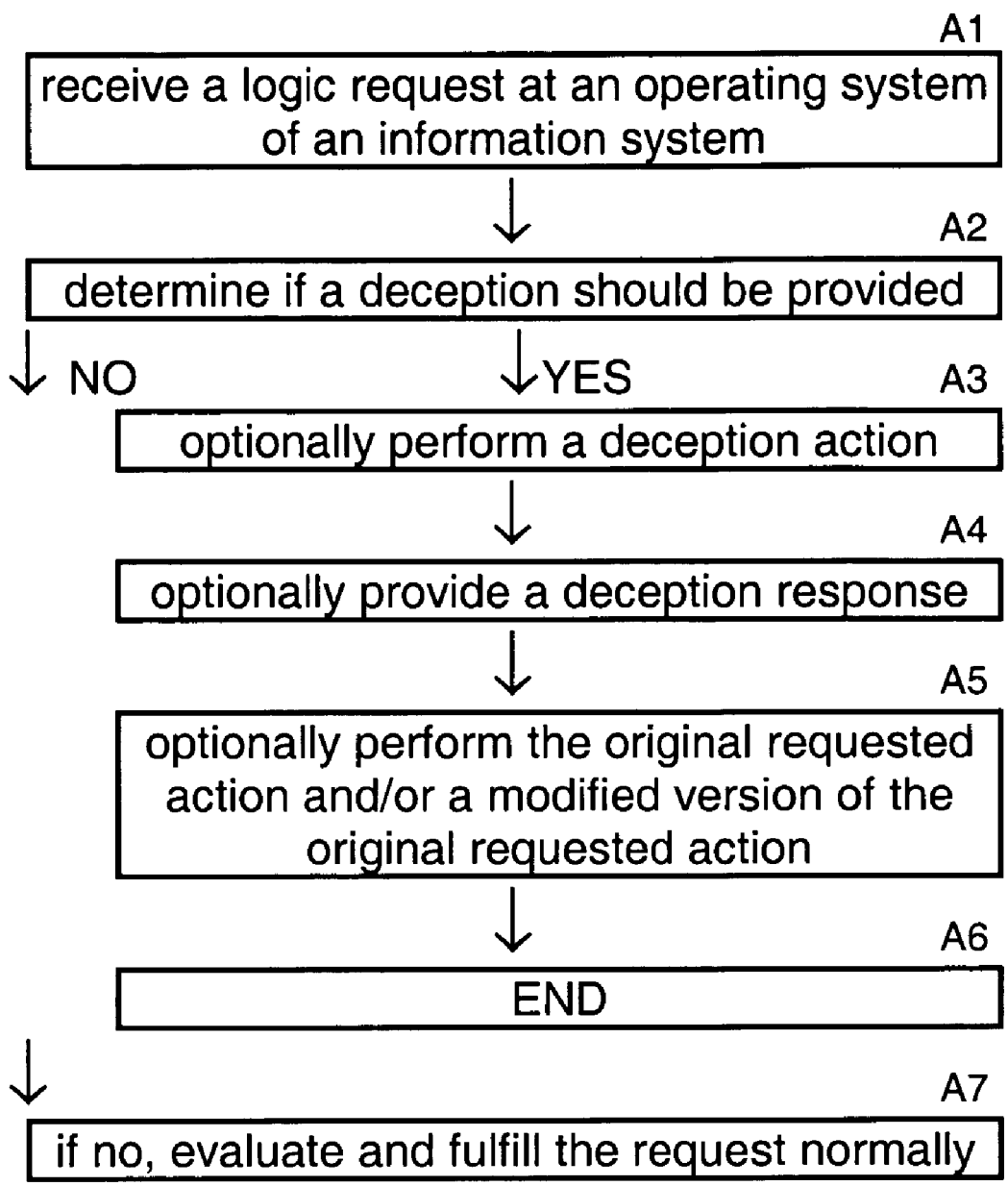
FIG. 1 is a flowchart illustrating a general method of providing deceptions in an operating system according to embodiments of the present invention.

Definition of Terms Relating to Specific Embodiments

Methods and/or modules and/or systems of the present invention according to specific embodiments relate to information processing systems. Information processing systems, by their nature, are very diverse in their particular embodiments and can be very diverse in the details of their implementation. Thus, information processing systems according to specific embodiments of the invention can include such things as personal computers, enterprise computers, super computers, communication devices such as servers, cellular telephones, personal digital assistants, control systems for factories, control systems for transportation devices such as automobiles, aircraft, military vehicles, etc., robots, automated laboratory equipment, etc.

Regardless of their embodiment, information processing systems generally include one or more logic components. These components can be referred to by a variety of terms and names. It will be understood to those of skill in the art that virtually any system that includes logic components and some type of programmed instruction execution will include general execution components, or closely analogous components, as discussed herein, regardless of the terminology used in particular systems.

An information processing system generally includes logic circuits or hardware (such as memory and/or other storage, a processor, input and output devices) and logic instructions that are executed on the circuits or hardware. In some systems, such as Java, virtual hardware is simulated using a further layer of abstraction, sometimes referred to as a virtual machine.

In many information processing systems, logic modules available or that can be run on the system can be generally grouped into operating system components and user application components. While this distinction in sometimes helpful for discussion purposes, it is generally not very precise. Email applications, network interface applications, printing applications, disk management or diagnoses applications, as examples, can all be either provided as part of operating system components or run as user application components. The operating system generally handles computer hardware and interface tasks, such as creating and managing a file structure, interacting with input and output devices, etc.

Operating systems further generally consist of two types of executable units, a kernel and other operating system components, which in some discussion are referred to as programs. The operating system kernel generally includes central logic routines that control the primary information processing hardware and resources, including control of memory allocation. In particular, the kernel controls the execution of other programs, whether those programs are operating system components or user application components. The kernel, in specific systems, can also be understood as a set of system calls. System calls are logic functions in a kernel that perform such operations as initiating a process, allocating memory, etc. A typical kernel can have anywhere from a few, to a few dozen, to a few hundred system calls.

In a typical kernel, a system call reference (such as exec (program_name)) is translated by the kernel to an address of a particular logic instruction sequence usually within the kernel using a look-up table, generally referred to as a system call table or system call index. It is generally known to augment an operating system kernel by providing additional system call logic usually at the end of the kernel and adding entries to the system call table. It is also generally known to modify an operating system kernel by providing additional system call logic in the kernel and replacing the address pointed to by a particular system call identifier in the system call table.

The kernel of an operating system typically provides a system call (or sometimes a set of system calls) used to initiate and run logic instruction sequences that are not provided in the kernel itself. This system call is typically referred to as the exec() call or exec() function. In particular systems, it can be invoked as exec(program_name); execvm(program_name), execve(program_name), etc. The exec() call typically performs some housekeeping functions, such as allocating memory, setting priorities, verifying privileges, etc., and then transfers execution to the logic identified by program_name, which is referred to herein as a program. Thus, in specific information systems, a program can be understood as any set of logic instructions that is initiated using an exec() system call. Using this definition, many operating systems and many user applications will include multiple programs.

Many information systems provide for execution of logic instructions in multiple processes. A process can generally be understood as a related set of logic execution resources (such as memory locations, register values, I/O connections, etc.) that is associated with a particular sequence of executing logic instructions and that are executing with a set of execution or process parameters (such as allowed memory actions, allowed interrupt actions, etc.) Processes are generally initiated and managed by the kernel using one or more system calls. A logic instruction string that wants to create a new process will generally do so using a particular system call, such as fork(). When such a system call is executed, the operating system kernel will perform a number of actions, such as: determine the resources that will be available to the process, create a process_id, for the process, enter the process_id in the process table. The kernel will generally also periodically give control of the information system's instruction execution resources to the process. Thus, another way to understand the operation of an exec() system call is a call that when executed in a process replaces whatever logic instruction string is running in that process with a new logic instruction string specified by the exec() system call. (To run a program in a new process, a logic instruction string generally will execute fork(), followed in the new process by exec().)

A kernel typically maintains a process table that identifies all running processes and includes process parameters used by the kernel such as process_id, process priority, process memory space range, process name, path of logic instructions executing in process, other process flags, etc.

One distinction generally enforced in information processing systems is the distinction between logic running in user (or protected) space and system (or kernel) space. System space generally refers to logic instructions that are operating at the most central level of the information processing system with little or no control provided regarding what memory or I/O locations are accessed by the instructions or what actions the instructions take. Thus, a logic instruction stream running in system space generally can read and/or modify any information stored anywhere in the information processing system and/or access or make changes to any resource of the logic system.

User space refers to a more limited or controlled environment for executing logic instructions. Generally, any logic instruction executed in user space can only access memory locations and I/O devices in ways that have been made explicitly available to those logic instructions by the kernel or other execution control logic running in system space.

General Methods of the Invention

In particular embodiments, the present invention is involved with one or more methods that can be implemented on generally any type of information system. In particular embodiments, a method according to specific embodiments of the invention can be used alone. In further embodiments, two or more methods according to specific embodiments of the invention can be used in combination as discussed further herein.

Protecting an Information System Using Operating System Deceptions

According to specific embodiments, the invention involves a method and/or logic modules for protecting an information processing system using deceptions at an operating system level. According to specific embodiments of the invention, this enhances system security because users attempting illicit or undesired or dangerous or unauthorized activities are deceived and can be countered in a variety of ways.

General deceptive techniques according to specific embodiments of the present invention can be further illustrated by considering that there are two dimensions involved in the response to requests at the operating system level: (1) the extent to which a request is fulfilled (ranging from not fulfilling a request to faithfully carrying it out) and (2) whether the responses to the requesting entity are accurate. In specific embodiments, the present invention provides responses ranging from precisely reflecting the outcome of the request to providing the maximum difference between the actual actions taken and the response given. In information systems and/or operating systems without deception, generally all authorized operations are carried out as faithfully as possible and all responses attempt to accurately reflect what was done. According to specific embodiments of the present invention, a range of responses including deceptive or false responses are provided.

FIG. 1 is a flowchart illustrating a general method of providing deceptions in an operating system according to embodiments of the present invention. This chart describes a general method that can be implemented by an information processing system. This method comprises the steps of receiving a logic request at an operating system of an information system. (Step A1.) As will be discussed below, such requests are typically in the form of system calls or program execution requests. Once received, a method according to the invention determines if deception is to be performed at the operating system. (Step A2.) This determining, according to specific embodiments of the present invention, can be carried out within the operating system and/or by external logic. If deception is to be performed, a method according to specific embodiments of the present invention optionally perform a deception action and/or deceptive request modification. (Step A3.) As discussed further below, an action can include no action (e.g., not acknowledging the request and providing no response at all), or performing the requested action on a different system, or performing a different action. Whether or not any action towards fulfilling the original request is performed, a method according to specific embodiments of the present invention optionally provides a deceptive response. (Step A4.) If it is decided to perform deception, a method according to specific embodiments of the present invention can also optionally perform the originally requested action (Step A5.) and then end. (Step A6.) If deception is decided against, a method according to the invention allows the request to be processed normally. (Step A7.)

Communicating with External Components

According to specific embodiments, a method and/or component of the invention changes operation of an information system at the kernel level of an operating system in order to provide deceptions. In specific implementations, alteration at the kernel is desirable because this allows methods and/or systems of the invention to intercept virtually every action performed by the information system. However, kernel-level alterations can be somewhat difficult to implement and to modify. Therefore, the present invention in specific embodiments is designed to make basic decisions and take basic actions at the kernel level and to communicate with external components to perform more involved decisions or take more sophisticated actions. Communication with external components allows the kernel elements of the invention to be fast and light. It also allows the invention to operate with little impact on ordinary execution, while allowing more substantial impact when it is desired, for example, to provide sophisticated deceptions or take other more sophisticated actions.

Figure 2:
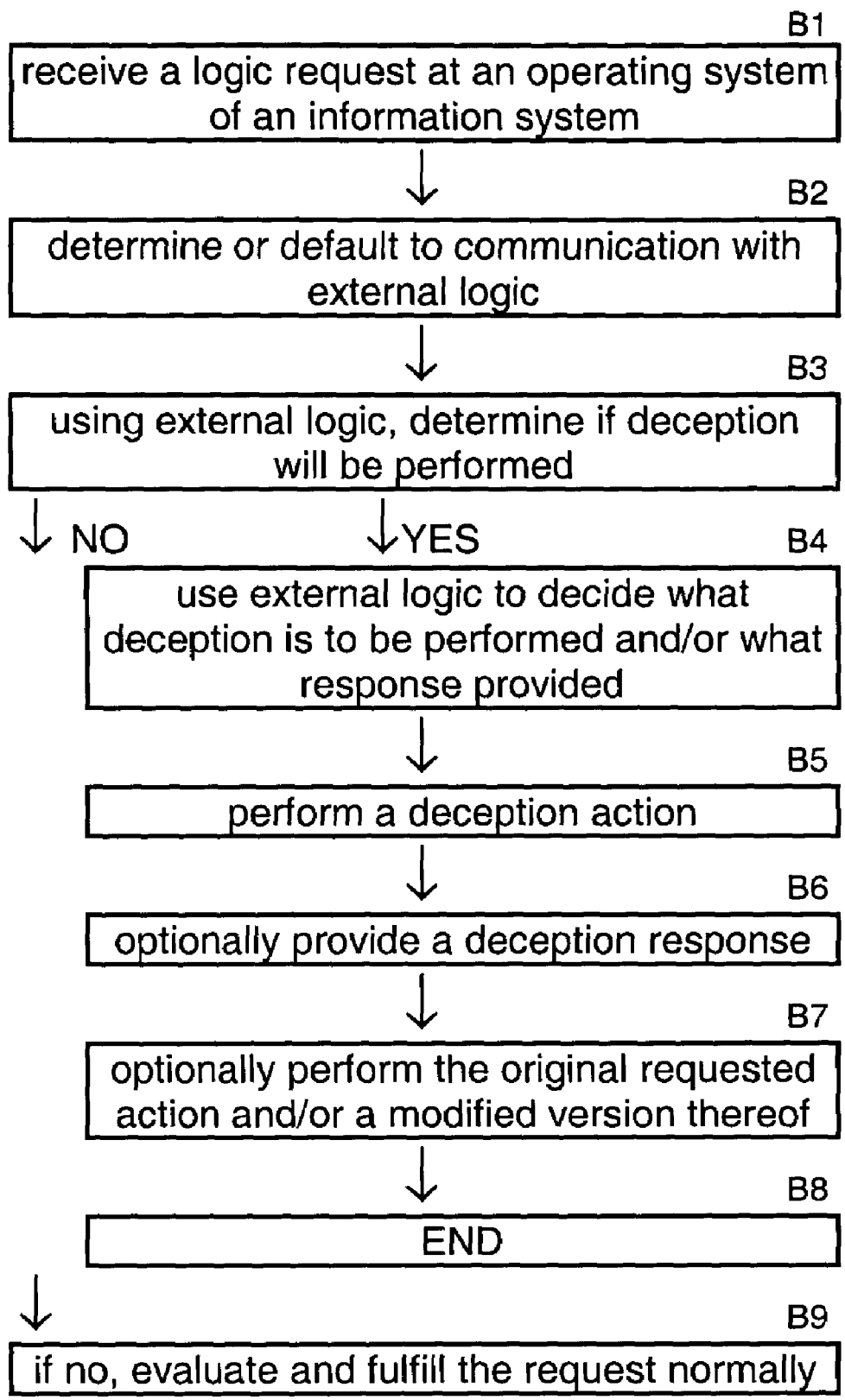
FIG. 2 is a flowchart illustrating a general method of providing deceptions in an operating system in communication with external components according to embodiments of the present invention.

External components, according to specific embodiments of the present invention, can be any resources that the kernel can access, either directly or though other components. In a typical embodiment, the kernel will communicate with one or more user space processes and those processes can, in turn, communicate with other in-system processes or with external systems or people. Thus, according to specific embodiments of the present invention. external components can comprise other system space processes, but preferentially comprise components running in user space, and can comprise components running on different information systems that are reachable via a communication media. External components can also comprise people, such as a human systems administrator who can be consulted about whether to provide deceptions in response to a particular process. In specific embodiments, external components can be consulted for one or more of: (1) deciding whether to perform a deception, (2) preparing responses, and/or (3) taking a substitute and/or additional and/or deceptive action. FIG. 2 is a flowchart illustrating a general method of providing deceptions in an operating system in communication with external components according to embodiments of the present invention. This method comprises the steps of receiving a logic request at an operating system of an information system. (Step B1.) Either for selected logic requests, or for all logic requests, communication with external logic is performed. (Step B2.) Once contacted, external logic determines if deception is to be performed (Step B3.) and determines what the deception action and/or response will be. (Step B4.) If deception is to be performed, external logic may perform the deceptive action directly and/or communicate back to the operating system what deceptive action shall be performed and/or response given. (Step B5 and B6.) If it is decided to perform deception, a method according to specific embodiments of the present invention can also optionally perform the originally requested action or a modified version of that action. (Step B7.) and then end. (Step B8.) If deception is decided against, a method according to the invention allows the request to be processed normally. (Step B9.)

Actions

According to further specific embodiments, actions taken according to method and/or systems of the invention may include actions that do not provide a deception of which a user is ever aware. For example, an action according to specific embodiments of the present invention, can include gathering and storing a set of system/process statistics at the time that a particular system request is made, and then allowing a request to be fulfilled normally. These statistics can then later be used in making various decisions regarding operations according to specific embodiments of the present invention, including providing deceptions.

According to further embodiments, the present invention can be understood as involving "friendly" deceptions, or, in other words, modifications of requests that are generally transparent to a user and that either help a user or reduce system resources. Such actions, according to specific embodiments of the present invention, can include such things as transparently correcting logic request syntax before execution, providing hints or help, redirecting logic requests to systems that are appropriate for them, retrieving cached results for a previously executed logic request, etc.

The above description of general methods can be used to implement systems and/or methods according to specific embodiments of the present invention on a variety of information systems. What follows are further descriptions of the invention and implementation details according to specific embodiments.

Implementation Examples

According to further embodiments of the invention, operating system deceptions can be implemented by one or more of:

1. designing or modifying one or more system calls to include deceptive responses and/or actions,
2. designing or modifying one or more system calls to communicate with external logic modules to make decisions regarding execution and/or responses optionally including deceptive responses; and/or
3. designing or modifying program execution logic in an information processing system so that just prior to a program execution, logic is executed that can examine a program execution request and can alter program execution, and/or provide deceptive responses and/or execute other components.

In various specific embodiments, deceptions, responses, and variations therein are controlled and/or influenced by an external decision process and/or module (at times, herein, referred to as the brains). In specific embodiments, different deceptions can be performed and the type and likelihood of deceptions can vary from call to call, time to time, or situation to situation.

System Calls Including Deceptions

In further embodiments, the invention can be implemented at the level of system calls of an operating system. This technique according to specific embodiments of the present invention can be used to selectively change the function of a large number of system calls by doing such things as: (1) selectively and/or probabilistically returning false responses to calling entities identified for deception; (2) selectively directing a calling entity to a different environment in which a system call will be performed; (3) selectively and/or probabilistically communicate with an additional module, including an external module, to determine responses to system calls; (4) selectively modifying or providing help in response to system calls. According to specific embodiments of the present invention, there can be multiple logic modules involved for one or more of these tasks. In a particular implementation, logic used to perform one or more of these deceptions can be referred to as a Kernel Deception Module.

Figure 3:
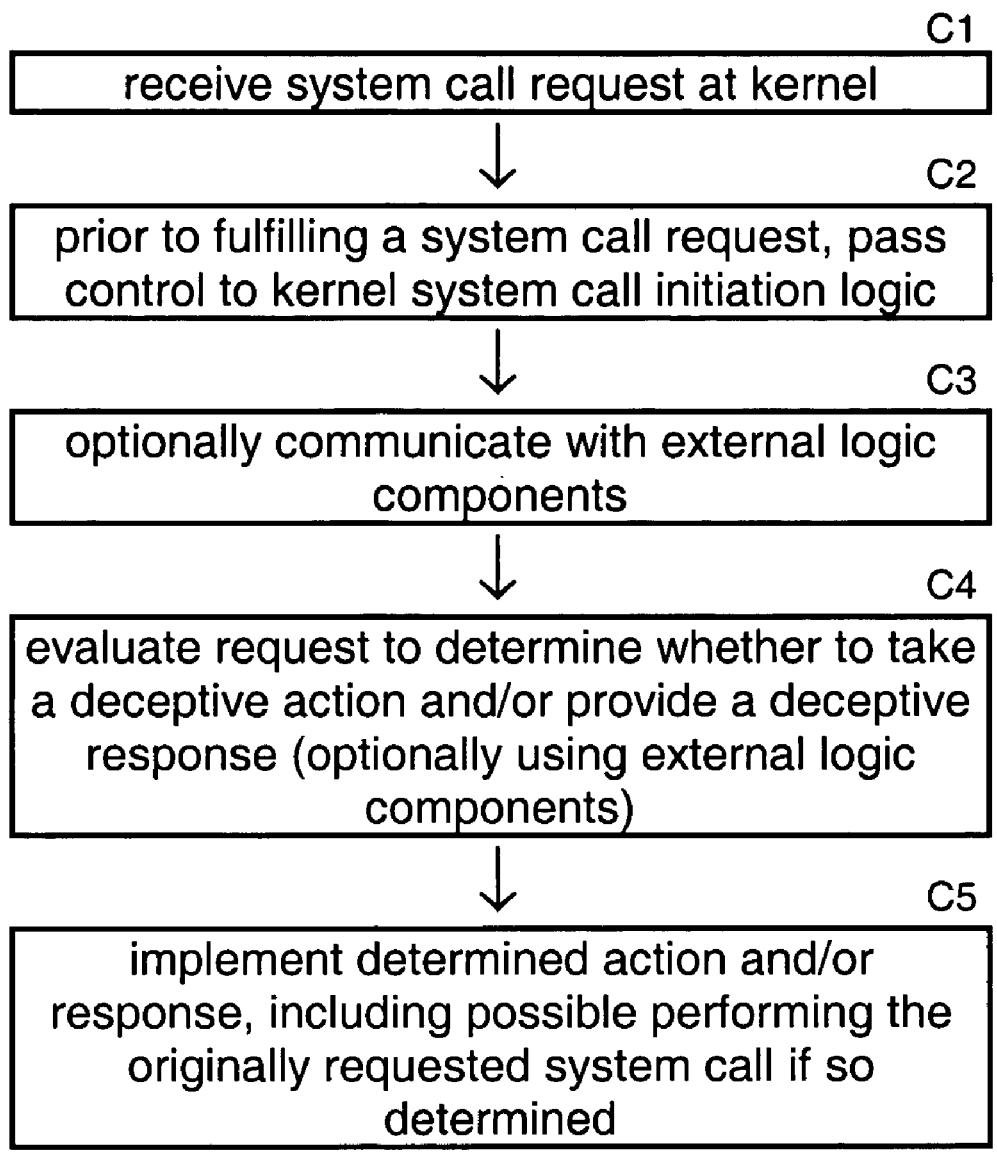
FIG. 3 is a flowchart illustrating a general method for affecting invocation of system calls in an operating system kernel according to embodiments of the present invention.

FIG. 3 is a flowchart illustrating a general method for affecting invocation of system calls in an operating system kernel according to embodiments of the present invention. This method comprises the steps of receiving a system call request at kernel of an operating system of an information system. (Step C1.) Prior to fulfilling a system call request, kernel logic passes control to deception enabled system call initiation logic. (Step C2.) Optionally, once initiated, deception enabled system call initiation logic can communicate with external logic components (Step C3.) and either alone or using external components evaluate the request to determine whether to take a deceptive action and/or provide a deceptive response. (Step C4.) Once the determination is complete, the kernel and/or external components implements determined action and/or response, including possible performing the originally requested system call. (Step C5.)

Thus, according to specific embodiments of the present invention, one or more system calls of an operating system are provided with deception abilities. Below are examples of such system calls, though other calls can also be provided with deception abilities according to specific embodiments of the invention. The example system call names below are from Linux and Unix-like operating systems. System calls in other operating systems can be also include deception abilities according to specific embodiments of the invention.

In the examples below, after the name identifier for each system call is provided a description of example deceptive operations of the call according to specific embodiments of the invention. It will be understood to those of skill in the art that these deceptive operations are in addition to whatever are the normal operations of the system call.

In particular embodiments, a calling or requesting entity (e.g., a process) is marked for deception and system calls take deceptive actions based on the marking. Marking an entity for deception may also be performed by one or more system calls with enhanced capabilities as discussed in the examples below.

Even when a requesting entity is marked for deception, whether or not to perform a deception and the type of deception to perform can be probabilistic. According to further specific embodiments of the present invention, whether or not to perform a deception, the type of deception to perform, and whether or not to take other actions, such as marking entities for deception, can be determined in part with the assistance of separate internal and/or external components, such as an external decision process. Further details of such a component are discussed below and in the included appendices. Some of these examples refer to particular implementation details that are further discussed herein. Other deceptive operations for system calls are possible as are other modified features as described herein.

As a further example, Table 1 summarizes normal and optional deceptive behavior of intercepted system calls according to specific embodiments of the invention. In addition to the responses listed in Table 1, each of the intercepted system calls may also return successfully without performing the requested action or fail with a phony error message. In this example, Linux system calls are used for purposes of illustration.

TABLE 1

| System Call | Example Normal Action | Example Deceptive Actions |
|---|---|---|
| open( ) | Open and possibly create a file or device | Open a different file than the one requested. Return a true or false file descriptor even if the requestor does not have permission to get the descriptor. Return a refused access response even if the requestor has permission to access. In specific embodiments, mark file objects for read and write deceptions. |
| read( ) | Read from a file descriptor | Return false data. |
| chdir( ) | Change working directory | Change to a different directory than the one requested. |
| stat64( ) | Get file status | Detect and decode an encoded filename so it can be converted to an inode and used for in-depth deception by other mechanisms. May also return false status information or alter status information to various degrees and in various ways. |
| lstat64( ) | Get file status | Return false or altered status information. Detects and decodes an encoded filename so it can be converted to an inode and used for in-depth deception by other mechanisms. |
| setuid( ) | Set user identity | Mark a process for deception if it requests an identified unauthorized change in user ID (UID). It may optionally change the UID to an otherwise unused UID for the purpose of further deception. than requested |
| setgid( ) | Set group identity | Set group identity (GID) to something different than requested. Mark a process for deception if it requests an identified unauthorized change in GID. It may optionally change the GID to an otherwise unused GID for the purpose of further deception. |
| setgroups32( ) | Set list of supplementary group IDs | Mark a process for deception if it requests an identified unauthorized change in the GID list. Sets the first GID in the list to an otherwise unused GID for the purpose of further deception. |
| getdents64( ) | Get directory entries | Return random or encoded filenames |
| write( ) | Write to a file descriptor | Do not write to the file but, respond as if write action was performed. Return either accurate or inaccurate information about IO performed or errors encountered. According to specific embodiments, write actions may be inhibited, made selectively, made to false storage locations, or made to real locations, and write responses may range from false rejections (e.g., indicating falsely that a memory location does not exist) to true responses regarding the function performed. |
| unlink( ) | Delete a file | Probabilistically perform one or more of: return success without unlinking the file (optionally indicating other return conditions), remove the file from a deceptive environment (optionally indicating success or various failure conditions), rename the file in a deceptive environment, (optionally indicating success or various failure conditions), cause corruption in the calling process space. |

TABLE 1-continued

| System Call | Example Normal Action | Example Deceptive Actions |
|---|---|---|
| rmdir( ) | Delete a directory | Probabilistically perform one or more of: return success without removing the directory (optionally indicating other return conditions), remove the directory from a deceptive environment (optionally indicating success or various failure conditions), rename the directory in a deceptive environment, (optionally indicating success or various failure conditions), cause corruption in the calling process space. |
| getuid32( ) | Get user identity | Do one or more of: return a false or true user ID, return a failed response, return a senseless response, or corrupt the calling process space. |
| getgid32( ) | Get group identity | One or more of: return a false or true group ID, return a failed response, return a senseless response, or corrupt the calling process space. |
| geteuid32( ) | Get effective user identity | Do one or more of: return a false or true effective UID, return a failed response, return a senseless response, or corrupt the calling process space. |
| getegid32( ) | Get effective group identity | Do one or more of: return a false or true effective GID, return a failed response, return a senseless response, or corrupt the calling process space. |
| getgroups32( ) | Get list of supplementary group IDs | Do one or more of: return a false or true effective group list, return a failed response, return a senseless response, or corrupt the calling process space. |
| chmod( ) | Change permissions of a file | Do one or more of: return success without altering the file attributes (optionally indicating other return conditions), change attributes in a deceptive environment (optionally indicating success or various failure conditions), or cause corruption in the calling process space. |
| rename( ) | Change the name or location of a file | Do one or more of: return success without renaming the file (optionally indicating other return conditions), remove the file from a deceptive environment (optionally indicating success or various failure conditions), rename the file in a deceptive environment, (optionally indicating success or various failure conditions), or cause corruption in the calling process space. |
| mkdir( ) | Create a directory | Do one or more of: return success without making the directory (optionally indicating other return conditions), make the directory in a deceptive environment (optionally indicating success or various failure conditions), or cause corruption in the calling process space. |
| delete_module( ) | Delete a loadable module entry | Do one or more of: return success without removing the module (optionally indicating other return conditions), remove the module while returning a failure indicator, remove the module in a deceptive environment (optionally indicating success or various failure conditions), or cause corruption in the calling process space. |
| socketcall( ) | Common kernel entry point for the socket system calls | Do one or more of: return success without carrying out the actual operation (optionally indicating other return conditions), carry out the operation while returning a failure indicator, or cause corruption in the calling process space. |

According to further specific embodiments of the invention, kernel deception responses can generally be characterized as listed below and one or more system calls can return such responses. Other responses can be adopted according to specific embodiments of the invention.

Garble: If a user does not have permission to read a file, random information is returned instead of the real file contents. This mechanism can also be used to garble file information data such as filename, creation date, permission status and so on.

Return success without performing request: In the case of deleting and writing to files, the system may choose to respond with a value that signifies successful completion, but without performing the action.

Return false user identity: One of the ways attackers measure progress is by checking their identity on the system. This mechanism tells the attacker that he has administrator privileges when he does not.

Random errors: If an attacker tries to execute a program or make a system call they have no access to, instead of returning the standard "Permission Denied" error, return a different error message that will give some plausible reason as to why the request was not fulfilled. This can lead the attacker to focus attention on areas other than expanding privilege level.

Rerouting directories and files: Instead of giving or denying an attacker access to a restricted file object or a directory, him access to something harmless that looks similar.

Hiding directories and files: Files and directories can be hidden from directory listings.

Inserting delays: Inserting delays in system calls lags the system's responses to the attacker, thus slowing down the attack.

Exiting prematurely: When a program makes a system call, instead of performing its function, the system call can terminate the program instantly.

According to further specific embodiments of the invention, these behaviors may be dependent on various parameters, such as one or more of:

Time cycle: The behavior may be based on multiple configurations, which change every few minutes or seconds;

Probability: In most circumstances, the system can randomly choose whether the requested action should be performed and whether to respond truthfully or falsely;

Fixed policy: Disabling optional features allows the system to behave under a fixed policy.

Implementation in a New Operating System

According to specific embodiments, the present invention can be implemented as a method and/or apparatus that are written and designed into an operating system from the inception of a new operating system design. Thus, the present invention can be embodied as a new operating system that includes in some of its native system calls or native functions, modules or mechanisms to facilitate deceptions as described above. Such an operating system will provide other operating system functions as understood in the art. In such an operating system, it may not be necessary or desirable to provide for an interception of system calls as described below because system calls can be written from inception to include deception ability.

Modification of an Existing Operating System

According to further specific embodiments of the present invention, the invention can be implemented by modifying parts of an existing operating system, such as selected parts of the kernel. In an example of such an embodiment, a system call deception module intercepts one or more system calls and provides additional logic allowing calls to provide deceptions as described above.

According to specific embodiments of the present invention, system call modifications to one or more, up to all system calls, can be made as follows. First, modify one or more system call address pointer entries in a system call table. Generally, for each system call for which deception or other modifications are provided, the entry for that call will be modified to point to a different logic location. In specific embodiments, for each system call that is modified, there is a different initiation/deception logic routine for that system call. Thereafter, when a system call is requested, the modified initiation logic code for that system call is run first. This logic code can optionally communicate with one or more modules external to the kernel to assist in decision making regarding actions and responses. The initiation logic code and/or other modules then determines whether modified action should be taken and what type of response to provide and implements those decisions. Optionally, the original system call may then be executed.

Other System Call Implementation Details

System Call deceptions, according to specific embodiments, can be implemented as a control module and a set of decision making modules. In a modification to an existing operating system, the control module intercepts system calls and, depending on the response it receives from decision making modules, optionally returns either an accurate or an inaccurate response and, optionally, grants, refuses to grant, or falsifies granting or refusing the system call request in a variety of ways.

A system call deception module according to specific embodiments of the present invention can also include a user space interface through a sys_ctl() type system call. This allows changes in the deception behavior to be made while deceptions are inserted and running in a system kernel. In further embodiments, a system call deception module provides for simulation of the /proc filesystem, which normally reveals information about the state of the system, in order to hide information about the deception module. According to specific embodiments, the invention can also transparently change deceived processes to access different storage and processing areas or systems during a system call. In specific embodiments, the invention hides the listing of modules involved in a deception so that the do not appear, for example, when an lsmod type command is executed.

System Call Rerouting Example

Figure 4:
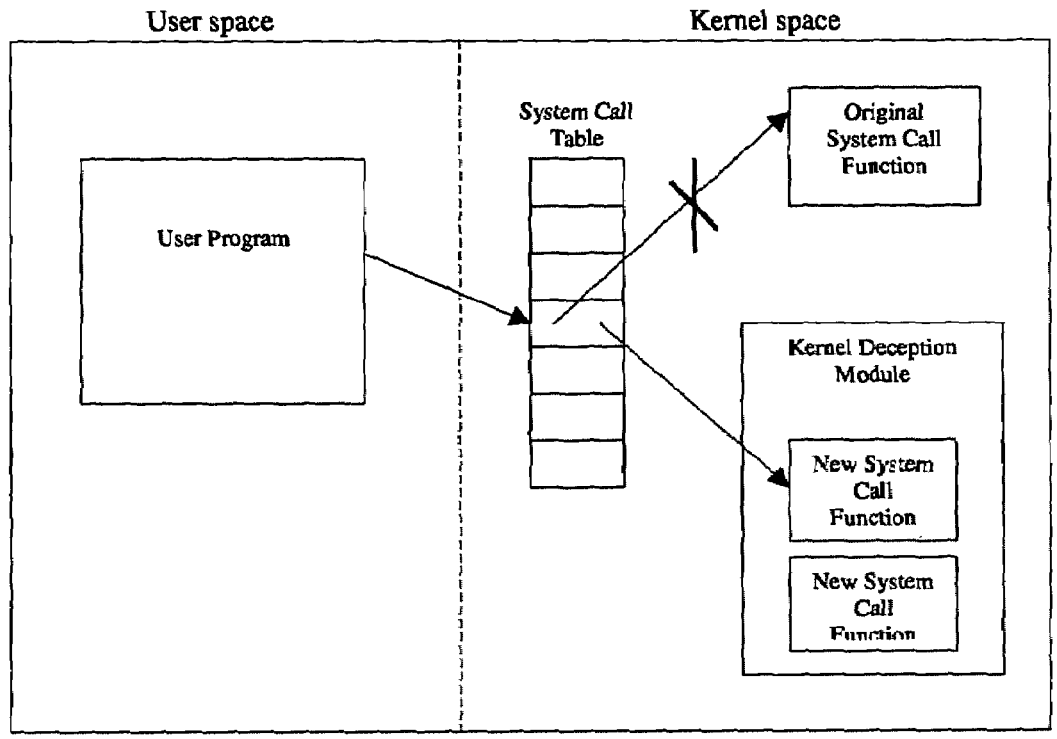
FIG. 4 is a block diagram showing an example re-routing mechanism that works by changing the function pointers in the system call table to point to deceptive system call functions according to specific embodiments of the invention.

One example method for providing system call deceptions according to specific embodiments of the invention was implemented by intercepting (or rerouting) system calls in the operating system kernel of a Linux-type operating system. In Linux, each system call has a unique system call number. The kernel maintains a system call table indexed by system call number that contains function pointers to the actual kernel function that performs the requested action. For example, the read system call, which reads information from a file descriptor, is system call number 3. When a user program calls read, the kernel references index 3 in the system call table and executes the pointed to function. On example embodiment of the invention modifies this mechanism to re-route system call requests to different functions in the kernel that include deceptive capabilities. FIG. 4 is a block diagram showing an example re-routing mechanism that works by changing the function pointers in the system call table to point to deceptive system call functions according to specific embodiments of the invention. As illustrated in the figure, in this example, when a user program in a user space invoked a system call in the kernel space, the system call table for that system call indicates a Kernel Deception Module. In particular embodiments, the system call table may directly indicate one of several different New System Call Functions. Alternatively, as discussed herein, the pointer may indicate one or a few system call functions that provide evaluation and deception as described herein.

Execution Wrapper

According to further embodiments, the invention provides a method and/or system wherein when a program is executed, a kernel or similar central control first runs a set of logic instructions referred to herein as a wrapper. According to embodiments of the invention, a executionwrapper at its most basic provides a mechanism allowing for an optional logic execution before an execution of a logic module is performed. As one example, an execution wrapper system wrapper (optionally in communication with other components) can evaluate a logic execution request and then decide what actions to take and/or what responses to provide, including possibly providing deceptive actions or responses. In a particular implementation, this aspect of the invention can exist without other system call deceptions as discussed above, or along with and independently of other system call deceptions as described above, or along with and in cooperation with other system call deceptions.

Figure 5:
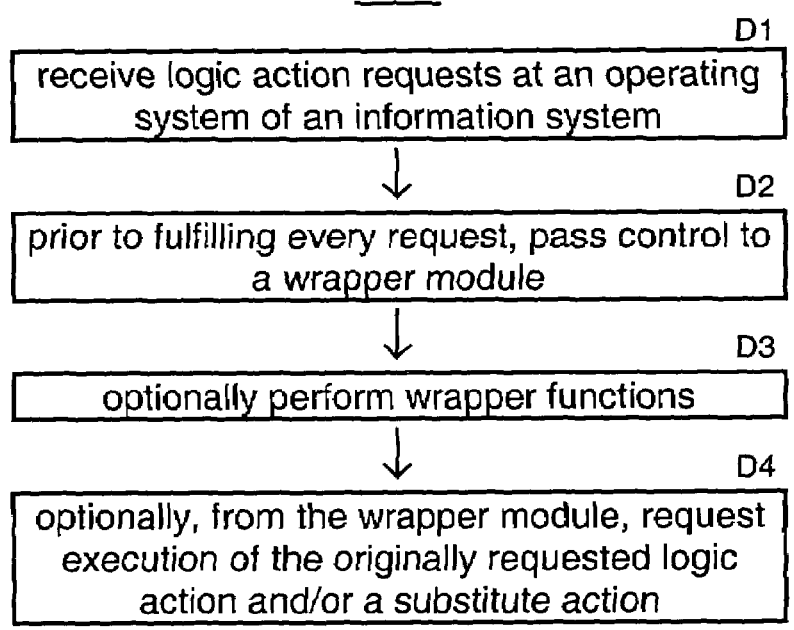
FIG. 5 is a flowchart illustrating a general method for affecting execution of programs in an operating system using a wrapper module according to embodiments of the present invention.

FIG. 5 is a flowchart illustrating a general method for affecting execution of programs in an operating system using a wrapper module according to embodiments of the present invention. This method comprises the steps of receiving a logic module (e.g., a program) execution request at an operating system of an information system (Step D1.) and prior to fulfilling generally every request, passing control to a wrapper module (Step D2.) which optionally performs wrapper functions as further described herein (Step D3.). After an optional evaluation, the wrapper then generally requests execution of the originally requested logic action and/or a substitute action and optionally exist. (Step D4.)

Figure 6:
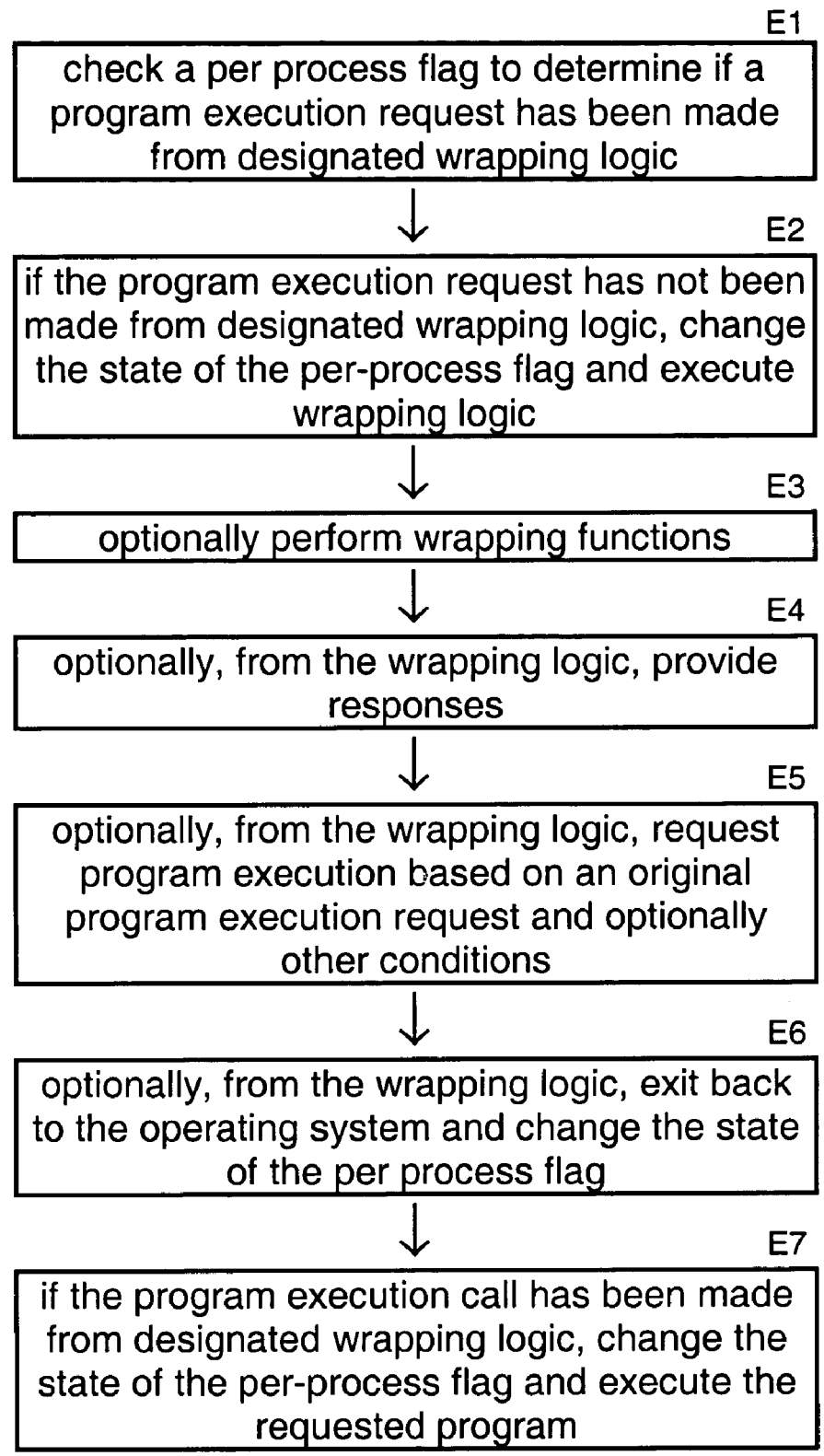
FIG. 6 is a flowchart illustrating a general method for affecting execution of programs in an operating system using modified execution logic and per-process flag according to embodiments of the present invention.

FIG. 6 is a flowchart illustrating a general method for affecting execution of programs in an operating system using modified execution logic and per-process flag according to embodiments of the present invention. This method comprises the steps of at every logic module (e.g., a program) execution request checking a per process flag to determine if a program execution request has been made from a designated wrapping logic (Step E1.) and if not changing the state of the per-process flag and execute wrapping logic (Step E2.) and optionally performing one or more wrapped functions as described herein (Step E3.) such as providing responses (Step E4.) and/or requesting program execution based on an original program execution request and optionally other conditions. (Step E5.) Finally, unless some other conditions indicate otherwise, the wrapping logic, exits back to the operating system and changes the state of the per process flag (Step E6.). Otherwise, if the program execution request has been made from a designated wrapping logic, change the state of the per-process flag and execute the requested program. (Step E7.)

Figure 7:
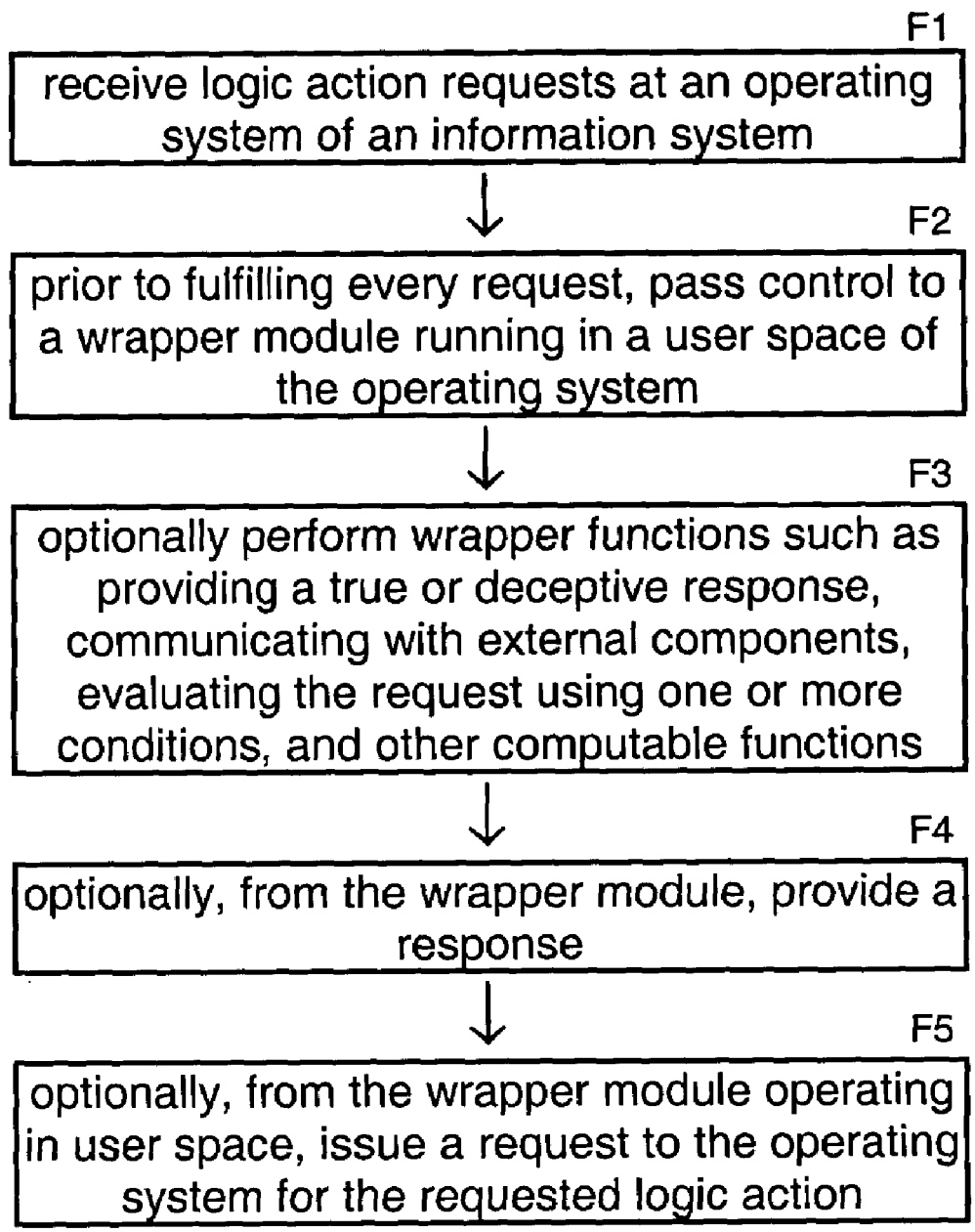
FIG. 7 is a flowchart illustrating a more detailed method for affecting execution of programs in an operating system using a wrapper module according to embodiments of the present invention.

FIG. 7 is a flowchart illustrating a more detailed method for affecting execution of programs in an operating system using a wrapper module according to embodiments of the present invention. This method illustrates an optional specific embodiment wherein a majority of wrapper decisions are made by logic execution in a user space.

Figure 8:
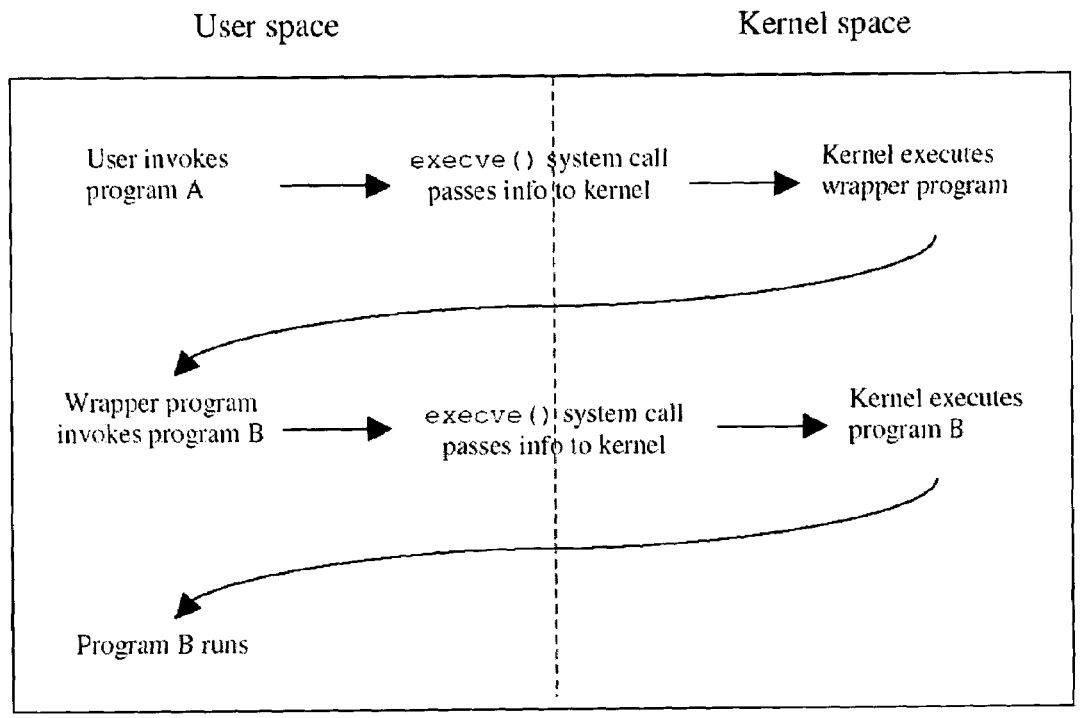
FIG. 8 is a block diagram showing an example wrapper mechanism that works by altering execution flow so that the wrapper program runs a different program than that requested by the user according to specific embodiments of the invention.

Like the system call deceptions discussed above, an execution wrapper according to specific embodiments of the invention can provide deceptions by modifying system responses. FIG. 8 is a block diagram showing an example wrapper mechanism that works by altering execution flow so that the wrapper program runs a different program than that requested by the user according to specific embodiments of the invention. Illustrated in this particular example, a user request for execution of program A causes the kernel to execute a wrapper program which in this example determines that an alternative program B should be executed and causes that execution instead. With the per-process flag option as indicated above, any subsequent program execution from program B will also cause the kernel to first invoke the wrapper logic.

Example Implementation

A particular example embodiment of a wrapper according to specific embodiments of the present invention is described below. In this example, an operating system's program execution mechanism is enhanced and/or modified. Such a mechanism is generally an exec() system call, though it can be variously referred to in different information systems. Generally, all information systems that allow for stored program execution other than the central kernel of the information system provide an analogous system call or function with analogous modes of operation.

According to specific embodiments of the present invention, when program execution is requested by any entity other than a wrapper, a modified exec() system call sets an execution value (e.g., a per-process flag in appropriate operating systems) indicating that before execution of the requested program, a wrapper must first be executed. Optionally after error checking and checking that the requested program would otherwise have executed, a wrapper is executed instead (e.g., for example, by calling exec(wrapper)) and is provided with relevant information regarding the original execution request.

In a particular embodiment, a wrapper according to the invention, executes in user space or other non-kernel space and, optionally, retains permissions associated with the original exec() call. In order to determine what actions should be taken, a wrapper optionally communicates with other decision processes or programs via inter-process communication (IPC) or other means. These processes may or may not have additional privileges and can reside locally or on remote systems. Some of these processes may optionally be locked in memory to assure higher performance, and they may or may not use additional storage.

A wrapper according to specific embodiments of the present invention further initiates a decision process to determine further actions. A decision process and/or module according to specific embodiments of the present invention can make decisions based on current, retained historical, and predicted future states and transitions, including but not limited to the specific examples discussed herein and in referenced patent application(s). Based on the decision process no action or one or more actions may be taken, including but not limited to example actions discussed below. In some of the examples discussed herein, a wrapper communicates with a usually external process referred to at times herein as "the brain", which provides more complex decision making and responses.

If a decision is made to execute the originally requested program, the wrapper typically executes the other program and terminates. In specific embodiments, a wrapper replaces itself in its process with the originally requested program and execution proceeds. In particular embodiments, this is done by calling exec() again, with the original arguments or optionally with modified arguments. In this second call, a kernel execution function (e.g., an exec() system call) according to specific embodiments of the invention checks the set execution value (e.g., a per-process flag for the process) and because the value is set, the kernel knows that it has been invoked from a wrapper and therefore executes the requested program. The kernel, however, will reset the value so that a further exec() call again invokes the wrapper. Thus, according to specific embodiments, the present invention provides a method and/or mechanism for fundamentally affecting program execution in an operating system using an alternating state of an execution value.

The above operation may be further understood by considering a specific example implementation in a Linux-type operating system. In such an operating system, a wrapper according to specific embodiments of the present invention can implemented by modifying the process control mechanisms of an operating system to include a 2-state per process execution flag, which when a process is created is initially set to a exec_wrap_true state. The exec() system call is modified to always check the state of that flag and if the state is in an exec_wrap_true, then exec() executes a wrapper instead of the requested program. Exec() or the wrapper or other logic ensures that prior to the wrapper calling an exec(), the execution flag is set to an exec_wrap_false state. As soon as exec() is allowed on a non-wrapper program, the exec_wrap-true state is set so that any further program execution request will be wrapped. A mechanism is also provided so that a wrapper can exit and cause exec_wrap_true to be set without executing another program.

If the wrapper decision is not to immediately invoke the original program, then an alternative action can be taken, including but not limited to actions discussed herein and in referenced patent application(s), and, possibly independently, a response can be given, including but not limited to the responses listed below. If a wrapper decision is not to execute the program, the execution value is reset and normal operation continues.

In specific implementations according to specific embodiments of the invention, the wrapper program can be concealed from execution and other traces. This can be accomplished via, for example, other per-process flags in the kernel and other modified kernel code or via other mechanisms as needed for specific environments. Using such techniques, a wrapper program according to specific embodiments of the present invention does not show up in a process table (e.g., proc filesystem in Linux) and other mechanisms that might be used to identify it.

Because a wrapper program according to specific embodiments of the present invention can be made to execute in user space, the invention provides for a logic module that is easily customized by including or modifying a wrapper to provide a custom wrapper and/or custom decision program. Once the function of first calling a wrapper before any program execution request is implemented, no further kernel modifications are needed. Thus, the invention is specific embodiments provides an easy mechanism for modifying the behavior and/or appearance of an operating system. As further illustration of the invention in specific embodiments, the invention can be embodied in one type of Linux operating system by modifying the kernel files: 1) /usr/src/linux/fs/exec.c; 2) /usr/src/linux/arch/i386/kernel/process.c; and 3) /usr/src/linux/include/linux/sched.h. An example source code appendix is provided with this filing. With these files modified to provide the initial call to a wrapper, different user space executable wrappers can be included in a system as desired to provide various functions and a wrapper function can be modified without requiring changes to other kernel functions.

Example Wrapper Uses and Modes

Thus, according to specific embodiments of the present invention, a wrapping mechanism, once implemented in an operating system, provides a flexible and modifiable mechanism for affecting program execution. One use of a wrapper according to specific embodiments is for logging all exec() calls, including collecting sophisticated statistics about all exec() calls. Because a wrapper is necessarily executed first, each time an exec() system call is invoked, a wrapper can be programmed to collect and store detailed process and/or system parameters at each exec(). These parameters can later be used as discussed below for further enhancement and/or protection of information systems.

Operating modes

Wrapper operation according to specific embodiments of the present invention can be understood as configurable to operate in different modes so that, for example, in a wrapper's maintenance mode, only auditing is done, in a learning mode, all actions are defaulted to operate normally while gathering the calibration information required for normal operating mode in which only situations encountered during calibration are permitted. An arbitrary number of modes can be defined in different wrapper implementations and/or installations with different characteristics and behaviors.

Using Multiple or Different Wrappers

With a wrapper mechanism in place in an operating system, different wrapper executables can be installed in the operating system to provide different functions. In certain test and operating environments, this can be a more convenient means of implementing and adjusting wrapper functions than providing a single wrapper with multiple modes. Because a wrapper, according to specific embodiments of the present invention, can be an executable file that runs in user space, using different wrappers allows an exceedingly easy method of changing wrapper functions in an operating system by replacing an existing wrapper executable file with a different executable file. In some of the examples provided herein, different wrapper modes or operation or functions are referred to by a name indicating their different operations. These are examples for particular purposes, and it will be understood that a single wrapper according to specific embodiments of the present invention can be programmed to include all of the functions of individual wrappers described in any particular example.

Thus, one action that can be taken by a wrapper according to specific embodiments of the invention is to simply execute the requested program. A wrapper logic code and/or executable file that only performs this function is referred to at times as a "null Wrapper" and is useful in testing and development.

Another action that can be taken by a wrapper according to specific embodiments of the invention is to simply check the state of a very limited set of parameters and perform two or more narrowly defined actions, one of which is to communicate with another component. For example, a wrapper may only check a single parameter, such as a per-process deception flag or process depth, and either execute the requested program or communicate with a more complex control program requiring more context and larger memory for facilitating more complex decisions and/or actions. A wrapper logic code and/or executable file that performs is this way is at times referred to herein as an "Interprocess Communication Wrapper" or "ICP Wrapper," indicating a wrapper that is in communication with other modules (at times herein referred to as the "Brains") for performing more complex tasks. When used in combination with, this permits a wrapper program, which is executed at every program execution, to remain small and fast.

Other example separable wrappers include a Logging Wrapper that logs parameters and then executes the requested program; an Access Control Wrapper that performs a table lookup type function for every called program and only allows execution of programs in a table based on program identity; a Depth Wrapper that uses process depth as control; a Process Lineage Wrapper that provides execution control based on a processes lineage, a Process Lineage Logging Wrapper that stores information about process lineage, an SSH Wrapper that executes programs in processes identified for deception on a different system, and wrapPLACD, a wrapper that combines process lineage, access control, and depth as controls. It will be understood that in a typical production implementation, all of these functions will be integrated in a single wrapping application, possibly similar to the IPC Wrapper, that will make some limited decisions at the first wrapper level and will communicate with other components (such as the Brain example, provided below) to perform more complex functions. The description of possible wrapper conditions, actions, and responses below should be understood to include aspects of wrapper operation which in different embodiments may be performed in a single wrapper module or may be performed by multiple wrapper modules.

Example Wrapper Operation Components

In particular embodiments, wrapper operation can be generally understood as comprising three components. It will be understood that a wrapper mechanism according to specific embodiments of the present invention in fact has a very wide application and its abilities are generally only limited by the limits of Turing computing by what information is available to it. In specific embodiments, as described herein, wrapper technology can be used to collect and organize further information to extend wrapper functions as generally discussed herein. Given that, for discussion purposes, a wrapper application according to specific embodiments of the present invention can be understood as comprising:

Conditions: Conditions according to specific embodiments of the present invention comprise parameters, data, information, or algorithms that a wrapper can use to make decisions regarding how to handle program execution requests.

Actions: Actions are actions a wrapper performs or initiates in response to a program execution request, optionally using conditions and/or other state information.

Responses: Responses are responses that a wrapper provides to an execution requestor or effects that a wrapper has on a requestor.

Conditions

A wide range of conditions can be used by a wrapper according to specific embodiments of the present invention. While the notion of conditions is quite general in that any combination of states and inputs available to the system can potentially be used by a wrapper, many specific types of conditions are of particular interest in affecting a wrapper's behavior. Some of these have not previously been discussed in published documents, particularly in the context of protecting an information system. Example conditions and their use according to specific embodiments of the present invention are:

Program identity: In this embodiment, a list of authorized programs is used to differentiate authorized programs from other programs that may exist in the environment. This can provide detection of any new programs added to the environment and also prevent the running of any new programs or new components. Additional safeguards discussed below can also be used to augment this capability. Thus, according to specific embodiments of the present invention, the invention provides a method and/or module that can be used in an information system to allow an administrator to prevent execution of programs other than specifically authorized programs or that can cause differential execution for programs that are unauthorized.

Process depth: In this embodiment, in relevant systems, a simple control on process depth can be used, such as a constant maximum allowed depth. A maximum process depth can also be associated with one or more particular requesting entities or requested programs so that, for example, no program can be executed at a depth in excess of its program-dependent value. A minimum depth can also be determined or specified and can be used independently or in conjunction with the maximum depth to yield a valid depth range for execution. Thus, according to specific embodiments of the present invention, the invention provides a method and/or module that can be used in an information system to variably control program execution based on process depth. It has been determined that this can provide some level of increased security in that extremes or unexpected process depth execution can at times be a symptom of malicious or erroneous program execution.

Process lineage: Using process lineage as a condition has been found to be very useful in information systems in which 'normal' behavior can be observed and recorded, especially when that behavior is highly constrained. In these cases, any and all parameters, variants and invariants available about processes can be used in conjunction with the parentage of those processes to determine whether to allow a process to execute a program. Complete lineage can be used in highly constrained situations. In less constrained situations, partial lineages in the form of subsets of a complete lineage can be used to validate or refuse program executions in context. In many typical information systems today, full process lineage information is not recorded or available. Thus, the invention according to specific embodiments can record process lineage by keeping track of the lineage of a process each time an exec() is called and can use a stored or recorded lineage to determine how to handle later exec()'s called by the process. It has been determined that patterns of process lineage can be associated with normal execution and other patterns can be associated with malicious or erroneous program execution.

External Parameters (e.g., Location, time of day, programs being run, User ID, Process ID, open files, network connections, and other process parameters): Many mechanisms have been previously used for limiting access to various functions in information systems based on a variety of parameters available to an operating system. These mechanisms however are generally not handled at the level of a program exec(). Using such mechanisms as conditions within the logic of an operating system itself can be complex to implement and modify. The present invention, according to specific embodiments, provides a method and/or module for implementing such control conditions based on external parameters, but running in a user space rather than kernel space. Thus, implementation, use, and/or modification of such components are easier to debug, safer to operate, can be multitasked or multithreaded, and can use operating system and network functions.

The set of readily available process parameters in modern systems is substantial and this provides a rich environment according to specific embodiments of the present invention for measuring variants and invariants and thus for generating conditions and metrics. In specific embodiments of the invention, measured metrics can be used to differentiate between normal program execution and execution that is malicious or erroneous.

System Resource Parameters (e.g., Memory, disk, and bandwidth used and available): Available and consumed system resources have previously been used in operating systems to limit overall resources for users. The present invention, however, according to specific embodiments extends this concept to require and/or limit specific resource consumption patterns and associate them with such things as processes, programs, process lineage, and/or system states. The invention, thus, in specific embodiments provides a capability for far more precise definition and control of resource utilization than was previously available and makes the implementation of these controls far easier than they would be if implemented within an operating system as part of a scheduling mechanism.

Program execution parameters and arguments: A wrapper according to specific embodiments of the present invention can examine program environment variables and command line arguments and use in decision making. For example, programs that are known to delete files can be controlled as to the files they delete, and environmental variables that are required for proper program execution can be forced for specific programs.

Presence or absence of other processes, programs, files, or connections: In addition to process lineage, the presence, absence, and situational information about other processes, programs, files, or connections can be used to make decisions about program execution. This includes but is not limited to refusal to run programs that should only be run once, requiring daemons or other system service logic to be present before running programs that require communication with those daemons, refusal to run more than a fixed maximum number of processes of a particular type, and/or limitations on conditions under which specific programs consuming substantial resources can be run. The final example can be used according to specific embodiments of the present invention to prevent deadlocks.

Other system conditions or states: Any other system conditions or states accessible by a wrapper or programs it interacts with can be used as the basis for decisions.

Remotely controlled settings and availability of external decision sources: The presence, availability, and responses generated by remote programs and/or systems and/or people can be used for decisions so that, for example, overall conditions of the larger environment can impact decisions in each computer. For example, when an individual is terminated for cause, wrappers in various information processing devices can be instructed via remote controls to prohibit certain processes or users from doing particular functions under particular conditions as part of the severance process.

File, program, memory, or input contents, location, fingerprints, time and date stamps, and/or size: Detailed examination of contents, locations, or other parameters of files, users, input contents, location, fingerprints, time and date stamps, and/or size can be used to discriminate between actions to be taken.

Current, historical, and predicted states and state sequences: By retaining historical data about information of the sorts described herein and applying this information in combinations or sequences, a wrapper can base decisions on context provided by this history in light of current situations. Predictive systems, such as those based on modeling and simulation, statistical models, projections, or attack graphs can also be used for decisions.

Tags, cryptographic keys, and other locking and control mechanisms and their states: Based on tags, paths, cryptographic keys, or other locking and control mechanisms, a wrapper can make decisions about and associate programs with each other so as to facilitate authorization decisions.

Condition Use

The above described conditions can be used individually or in combination to provide a very rich environment of conditions, all of which can be made readily available to a wrapper according to specific embodiments of the invention. Implementation of these functions would be considerably more complex if applied through other current or anticipated technologies.

Statistical Conditions

According to specific embodiments of the present invention, a wrapper can use statistics parameters regarding such things as process depth, such as mean and standard deviation or similar measures. These statistics can be collected and compiled by a wrapper according to specific embodiments of the present invention either during real world or simulated system operation. Statistics can also be provided to a wrapper from any other source. Thus, according to specific embodiments, the present provides a method and/or module that can be used in an information system to affect or control program execution based on previously determined or otherwise provided program execution statistics, thereby increasing security or providing some other actions such as reporting or help functions as further discussed below. Similarly, statistical conditions can be used by combining the conditions discussed above with random or pseudo-random generated or stored values.

Actions

Actions that a wrapper can take according to specific embodiments of the invention are in general unlimited except by the limits of Turing computability. In specific embodiments, a wrapper can transform any requested program execution into any computational capability available to the system. Examples of actions according to specific embodiments of the present invention are given below, though a practically unlimited number of other actions are possible according to specific embodiments of the invention.

Run/execute a requested program: A wrapper can run the original program as requested and without alteration.

Refuse to execute a program: Program execution can be refused. In this case, a wrapper terminates leaving a return code and possibly generating error messages or other responses for the original requestor. A wrapper or the operating system ensures that the execution value is reset so that at the next program execution request, a wrapper is invoked.

Provide responses on its own: A wrapper can produce behaviors and respond directly to the calling program as if it were the program being executed. For example, for certain programs, specific error messages would be generated with some time delay to create the illusion of an understandable failure.

Run a substitute or additional program: A wrapper can substitute any program for any other program on a controlled basis or first run an additional program before running a requested program. This is very useful for a wide range of applications. For example, the nslookup command has been replaced by the host command in some Unix-based systems. Rather than produce an error message and unexpected behavior, a wrapper can be programmed to make the substitution for the user and produce backward compatible results. Again, with the wrapper technology according to specific embodiments of the present invention this can be done in a user space wrapper program, without further modifying an operating system. Some other examples include the transparent and automatic execution of distributed programs across a network of computers, running a program that produces additional side effects like auditing, running a program on another computer, running a program in a computing environment well suited to its execution, running a program that simulates proper responses while taking reversible actions, running a program that simulates proper responses while taking no action, running a program that simulates error responses, and so forth.

Consult with other local or remote components and carry out their instructions or combine their instructions with its own: Combinations of built-in, local programmed, and remotely accessible responses can be used based on the specific circumstances. For example, if remote controls are not available, local decisions can be made in their place, and default decisions can be built into a wrapper in case decisions outside of a wrapper are not available.

Tunnel execution to other environments, systems, or programs through interprocess communication, networking technologies, or other communications means: In this technique, a wrapper uses another transport technology, such as Internet Protocol, an encrypted data link, a modem, or an interprocess communications call to invoke programs in remote or controlled environments. For example, execution of programs identified as potentially hostile can be invoked on a more secure system available over a network interface with results returned to the local user processes. This produces extremely realistic responses without risk to the local system. Similarly, if a program is designed to operate in a Windows environment, it can be invoked from a Unix environment and remotely tunneled to the Windows environment for execution. Sets of systems with wrappers can be used in conjunction with each other to separate functions across systems so as to balance load, create a unified environment out of a diverse one, and create high fidelity deceptive responses as parts of more complex deceptions.

Divide execution across platforms for parallelization of tasks or to gain access to networked resources transparently to the calling process: By tunneling execution combined with automated division of programs or data, a wrapper can facilitate transparent and automatic distributed computing. For example, a file listing command can be sent to a network of computers by a wrapper for situations in which the listing requested is in a 'network' directory. The results from the networked computers can then be fused together at the requesting computer to form an aggregate listing without altering existing scripts or requiring the user to learn about or cope with changes in the network environment.

Execute a program in altered environments or contexts such as on other computers, in 'sandbox' environments, or with altered environmental variables or simulated file system, process, memory, and IO conditions: Like the situation for tunneled environments, local 'sandboxes', 'chroot' environments, and other methods can be used to execute programs under tighter than normal control. Similarly, environmental variables such as field separator characters and paths can be altered prior to execution to produce a different environment for that execution. Input and output can be redirected prior to execution of the real program as well.

Modify programs or their arguments or environments before execution: Programs being executed can be examined and altered prior to execution, such as, for example, to remove known viruses, to detect Trojan horses, to alter internal pathnames for a particular environment, to strip them of unnecessary symbols, or to automatically decompress or decode them. System-specific system calls can be altered by a wrapper so that programs not designed to operate in the specific environment are adapted to local use in real time. Command line arguments can be modified, for example, by replacing pathnames that do not exist with substitute pathnames specifically configured to a particular computer.

Provide error correction and augmented or altered functions: Typographic errors can be corrected, abbreviations resolved, and other corrections can be made to program arguments to assure proper execution, alter execution, prevent, or induce specific failures, augment human inputs, or add features like automated help and related materials to existing programs. Program inputs can be added, removed, or altered by a wrapper, for example, to correct erroneous input sources or to remove or replace undesirable arguments.

Authorized versions of programs can be substituted for unauthorized versions and run in their place: If the user is attempting to run an unauthorized version of a program, perhaps as a result of an error or the placement of a Trojan Horse in the execution path, the authorized version of that program can be substituted by a wrapper for normal execution.

Keys can be associated with programs by a wrapper to facilitate authorizations, identifications, or other augmented content or capabilities: By adding or removing arguments, environmental variables, or otherwise enabling or inhibiting functions or capabilities, a wrapper can facilitate or inhibit authorized or unauthorized executions, and augment or reduce execution requests to add, remove, or alter tags, cryptographic keys, or other similar mechanisms required or disallowed by other elements of the operating environment. A simple example would be adding a signature to a program execution request and forwarding it through a cryptographic tunnel to a remote environment wherein it would be executed.

Programs, IO, files, and other content can be encrypted, decrypted, signed, or verified by a wrapper or sent by a wrapper to other devices or systems for encryption, decryption, signatures, or verifications in order to facilitate or inhibit authorized or unauthorized use: A wrapper can automatically encrypt, decrypt, sign, or verify programs or data, recode programs or data, invoke external hardware or software encryption, decryption, signature, or verification mechanisms, or create additional execution chains necessary to support these processes for existing programs. As an example, the automatic addition of digital signatures in architectures such as the Palladium digital rights management system can be done by a wrapper so that any user program can be authorized to run under the specific circumstances approved by a wrapper.

Tags can be added, removed, or modified to facilitate application to tagged architectures and similar association methods of control: In tagged or other authenticated architectures, a wrapper can add tags and related information to provision programs for execution where they otherwise would not operate. In this mode, a wrapper becomes a necessary component for execution of programs and thus cannot be bypassed or disabled without preventing execution of normal programs. Similarly, a wrapper can be used to remove tags from unauthorized programs so as to prevent their subsequent execution, alter tags so as to alter the authorization processes, and used to 'declassify' or remove constraints on access so as to provide an automated guard application.

Augmented authentication: According to specific embodiments of the invention, a wrapper can perform additional authorization processes, select programs or sequences or sets of programs can be selectively controlled. This includes but is not limited to the use of standard reauthorization, biometric checks, reverificaiton of authorization, provision of additional controls not otherwise present in the operating environment, or cross-platform checking that is transparent to the user. It can also be used to implement DCE-like checks through Kerberos or similar programs, with the specifics of the check method not requiring modifications to the operating system.

Multiple versions of program can be run with results compared for redundancy and to assure high integrity in critical environments.: By invoking several programs for each program request, a wrapper can create a redundant execution environment for high assurance applications without alteration to user programs or other aspects of the operating environment. By using the tunneling mechanisms similar to those described above, redundancy can be extended across a networked environment.

Cached results from previous command executions can be used to save time and resource consumption for frequently requested information.: In much command line computer usage, the same command is executed repeatedly because of the limitations of available context on a screen. In many cases, the results from previous executions can be cached and a wrapper can present the results without rerunning the program.

Prioritizations, locks, and scheduling changes can be implemented by a wrapper to alter the normal priorities associated with program executions: Using the 'nice' prioritization scheme under Unix, as an example, a wrapper according to specific embodiments of the invention, can reduce the priority of each process according to environmental conditions prior to execution, thus automatically controlling the relative impact of users and programs on the overall computing environment. Similarly, a wrapper can selectively induce intentional delays into the executions of programs so that they are invoked only when sufficient resources for their completion are available. This can also be used to limit processes on a finer grained basis than user-based controls in current systems. For example, a wrapper can do such things as one or more of: (1) assure that only a limited number of simultaneous command scripts can be executed, perhaps delaying others pending completion; (2) assure that a given program can only execute a maximum number of times at once by any given user; (3) assure that a certain program must be run by a user in order for other programs to be run (such as a logging program the records keystrokes being required in order for users to execute programs); (4) assure that no two users can simultaneously run a particular program; and/or (5) assure that multiple versions of the same daemon cannot operate at the same time, and so forth.

Preconditions for program execution can be checked and automatically invoked by a wrapper to assure proper sequencing of operations and eliminate errors and omissions: A wrapper can check for the presence or absence of environmental conditions, such as other programs, files, and so forth, and create or remove those conditions so as to facilitate or inhibit proper or improper functioning of the programs. For example, in the case of a deception, the removal of conditions might create inhibitions to execution, while for normal execution, the creation of preconditions might enable execution.

Built-in interpretation mechanisms of programs can be augmented to handle more complex arguments through preprocessing by a wrapper: By examining content prior to execution, a wrapper can alter or rewrite content or modify the execution mechanism so as to alter program operation. For example, macro preprocessing of command parameters or inputs can be done by a wrapper to reformat it for use by the invoked program, and outputs from the program can be altered by a wrapper to be suitable for the next program executed in a pipeline of programs.

The set of interpretable programs can be augmented by a wrapper by the creation or selection of suitable execution environments for otherwise uninterpretable content: A wrapper can examine the content of a command script or other file to be executed, determine the proper interpretation mechanism, and invoke that mechanism even though the operating system would normally be unable to execute the content. This offers an alternative mechanism for creating automated handling of user requests, similar to the point and click mechanisms of many graphical interfaces, but without the need to alter the behavior of the graphical interface or making additional operating system modifications. The interface merely 'executes' all requested items, whether files, programs, or directories, and a wrapper decides how they are to be executed and, for example, changes to a directory if it is executed, runs a program if it is executed, and invokes an appropriate interpreter for a program if it is executed.

A wrapper can limit available resources to the program, consume resources on its own, or alter the privileges of the program: By issuing system calls, a wrapper can selectively alter resources like memory, disk space, execution time, or file handles available to a program being executed prior to its execution. This can be used to limit the effect of a program on the environment. A wrapper can also consume resources like time and space prior to execution of the original program, so as to limit the available resources in the environment once the original request is honored.

Many of these actions can be combined together or selected based on conditions. In combination, one or more of these actions form a rich environment of applications for a wrapper technology. According to specific embodiments of the invention, these actions can be invoked at random, in a coordinated fashion, or in a mix of random and specifically controlled fashions so as to increase the complexity required of counterdeception systems.

Responses

A wide range of responses can be provided by a wrapper according to specific embodiments of the invention. As discussed herein, not all responses have to correspond to the reality of what was done by a wrapper. In effect, a wrapper can provide any response it is programmed to provide, regardless of what it actually does. Examples of responses provided by a wrapper according to specific embodiments of the invention include one or more of the following:

Provide the real response of the program run: A wrapper need not alter the normal response of the program it invokes.

Never return: A wrapper can simply invoke an indefinite sleep call and never return to the calling program. Similarly, it can invoke arbitrary delays in program execution.

Appear to consume resources: A wrapper can simulate the consumption of resources in various ways. For example, it can generate a large number of disk seeks while waiting for several minutes and then produce an output, it can generate random network traffic of the expected type so that it appears to be sending an encrypted message when it is not, and so forth.

Falsify legitimate responses without actually doing the requested function: A wrapper can generate fictitious results to commands, optionally in conjunction with apparent resource consumption and delays, followed by apparently correct completion.

Falsify responses so that they appear legitimate but are not: This technique involves creating deceptive responses that require substantial effort to verify or refute by the user or programs operating on their behalf. For example, obscure but feasible error messages can be generated requiring that the user look them up and try to figure out why their program produced these results.

Provide responses that do not make sense in the context of the execution requested: A simple example would be the production of output from a different command or with different command line options than the request.

Generate dazzlements that exhaust resources of the calling program or otherwise to cause it to fail: A wide range of dazzlements can be used for different purposes. For example, the use of 8-bit characters can induce displays to become unreadable, the use of optical patterns can cause eye problems, and the induction of flashing patterns can induce seizures in susceptible individuals. Similarly, unexpected output to programs can cause those programs to fail in hard to anticipate ways, cause them to crash, cause them to invoke commands not anticipated by their authors, and so forth. All of these patterns and others can be generated by a wrapper.

Generate responses to induce the user of the calling program to incorrectly process the resulting content: By creating realistic but inaccurate results or altering returned results of the original program, the user applying those results in various ways will generate improper actions. A simple example is the use of slight alterations to character sequences inducing the user to type wrong inputs on subsequent actions.

Generate responses that induce subsequent programs handling response data to fail to operate properly or as expected by the user: Specific responses can be used for specific programs to cause them to behave in desired manners. For example, if results of an action are being sent to a command interpreter on a remote machine, that command interpreter can be induced to execute commands created by a wrapper.

Generate responses that induce syntactic or semantic errors, resonance, or dissonance in programs, people, and systems handling those results: By controlling the extent of the difference between wrapper responses and normal responses, a wrapper can induce different behaviors in human and automated mechanisms interpreting those outputs.

Produce illegal, undefined, expected, or unexpected return values: By setting return values, a wrapper can cause calling programs to act as if the program failed when it succeeded, succeeded when it failed, succeeded when it succeeded, failed when it failed, or failed in modes that are different from the actual failures of the program.

Generate audit data for calibration, intrusion detection or other security systems: According to specific embodiments of the invention, a wrapper can generate audit data that can then be used to make decisions about how to configure a wrapper for particular environments. This and additional audit data can be of use to intrusion detection systems and other security systems as well as for performance tuning, resource allocation decisions, and other related purposes. With audit data, calibration of detection and triggering mechanisms to particular environments is possible. A 'normal' behavioral pattern can be detected and differentiated from other behavioral patterns as a basis for discrimination.

Set, alter, control, or interact with other deception mechanisms: A wrapper can set other deception flags, such as the flags used by the System Call Deception Module, alter the control decisions of other defensive mechanisms, act as a component of overall deception controls, or act as a sensor and response mechanisms for an external deception and system control system.

Generate automated configuration information for calibration of detection mechanisms to particular environments: Using audit data, a wrapper can automatically generate information required for calibration, optionally invoke that calibration, optionally create a set of conditions adapted to the specific environment, and optionally invoke those conditions so as to adapt a wrapper to the environment either on an ad-hoc basis or in real time. Similarly, this data can be evaluated in separate processes or in non-real-time and update a wrapper at a later time based on its analysis.

Create combinations and sequences of responses consistent or inconsistent with particular environments: By invoking these response mechanisms in combination and sequence, consistencies and inconsistencies can be introduced into the environment so as to produce a wide range of effects. These include but are not limited to the creation of fictitious responses that generate false information for automated intelligence gathering systems, the generation of errors on a random basis with a probability such that humans can still operate but automated programs not anticipating these errors will not detect and correct for these conditions, and the generation of accurate depictions of other, perhaps tunneled, environments.

Generate responses correlated with other response mechanisms so as to produce an overall deception in keeping with a desired deception plan or illusion:

Many of these responses can be combined together or selected based on triggering conditions and actions, and in combination they form a rich environment of applications for a wrapper technology.

By randomly and/or selectively generating different responses based on time, use, or other environmental or fixed factors these techniques can be mixed in a wide variety of ways.

Example Wrapper Operation

One vulnerability that will be generally understood to those of skill in the art is the case where an input overflow causes a server program to be taken over by a malicious code snippet that executes a command interpreter and makes the command interpreter usable via remote network connections. With the present invention in operation, if this occurrence involves the execution of a command interpreter from within a running program or process that normally does not execute command interpreters, this can be detected by a wrapper, for example using process lineage, and as a result a wrapper can take one or more actions such as:

(1) Refuse to run the command and/or program, thus defeating the attack and informing the attacking program of the failure (i.e., access denied, accurate response);
(2) Appear to run the command and/or program without really running it;
(3) Run a substitute command and/or program with similar behavior but without the ill effects;
(4) Run the real command and/or program in another computer;
(5) Run the command and/or program in a simulated computing environment such as VMware;
(6) Run the command and/or program with operating system deceptions enabled (e.g., marking the process for deceptions so that system calls will provide deceptions) so that it would get and use false information;
(7) Run the command and/or program normally but react to other commands executed by resulting processes; and/or
(8) Log the attempted access and inform other detection and response mechanisms.

One of these behaviors can be optionally specified via a control file using triggering/condition parameters chosen from information available to the wrapper program or from a program or module the wrapper communicates with for decision-making and response mechanisms chosen from the available response mechanisms provided in other deception mechanisms.

Combining Wrapper Methods

According to specific embodiments of and of the invention and in specific implementations, many different combinations and sequences of triggering conditions, actions, and responses can be combined to form overall deception environments. The wrapper can combine these sets of things in conjunction with people, systems, and programs, to create large-scale cohesive depictions of situations. As this overall deception picture becomes more complex, so does the control mechanism.

In a production system using complex conditions as identified above, a specific syntax can be implemented to allow conditions and/or actions and/or modes and/or responses to be controlled readily. Based on the first triggered condition and with optional continuation to further rules, such a production system can cause an action selected from those listed above to be taken and provides optional responses from the set listed above for the calling program. The decision results are passed back to the wrapper for its invocation of the specified action and response.

A more general purpose mechanism can also be implemented in which arbitrary programmed control can be invoked in each decision and the control functions can be reprogrammed during operation and adapted automatically to circumstances.

These control systems can be made to interact with a wrapper through shared memory and/or interprocess communication. Since the wrapper is executed each time a program execution is requested, performance is greatly enhanced by making the wrapper small and fast. In order to get complex decisions based on large context, large amounts of memory and time may be required. As a result, control mechanisms are preferably implemented as separate programs that optionally stay resident and are called by the wrapper for decisions on each execution. This scheme also allows for remote controls over networks, and is augmented by default decisions in the wrapper to allow operation when the control technologies fail. The control technology can also use other means to invoke control over programs already operating so that a decision to run the normal program in the normal manner can be made immediately while subsequent analysis may be used to alter execution at a later time. As a specific example, a previously running program in the process lineage of an existing process that is detected as anomalous can be terminated or paused based on the actions of its ancestors. Similarly, actions against a known anomalous program can be intentionally delayed so as to observe or track attackers and reduce the ability of the attacker to determine which of their actions triggered the response.

Example Implementation of an Execution Wrapper

According to specific embodiments of the invention, an example designated wrapper program is a user space program that is invoked on every program execution and cannot maintain state information. Since knowledge of a user's history (e.g., commands invoked, deceptive responses provided, etc.) is useful for supplying consistent deceptions, an example wrapper program communicates with a decision making component of a deception system according to specific embodiments of the invention. When the wrapper program is run, it asks a decision making component, which maintains all the relevant state information, how it should respond to the user's request. The Decision Maker makes the decision and sends its answer back to the wrapper, which then responds to the user accordingly.

One example Execution Wrapper for the Linux operating system was implemented using kernel version 2.4.18 by modifying sys_execve(), the program execution system call. The following files were also modified to support the Execution Wrapper mechanism:

```
/usr/src/linux-2.4.18/arch/i386/kernel/process.c
/usr/src/linux-2.4.18/fs/exec.c
/usr/src/linux-2.4.18/include/linux/sched.h
```

In this example embodiment, the wrapper program and the decision maker communicate through System V message queues. When invoked, the wrapper program sends the following information to the Decision Maker:

its process ID
its parent's process ID
its user ID
The original command invoked by the user According to specific embodiments, this information is formatted as a string, as illustrated in the table below, with each piece of information separated with a space.

TABLE 2

| Process ID | Parent's Process ID | User ID | Original Command invoked by the user | Arguments to command invoked by the user |
|---|---|---|---|---|

Using this and optionally other information, the decision maker decides how the execution wrapper should respond and sends back an instruction representing the action that the wrapper program should take. Example responses include:

Run the original command on another system
Fail and print a specified error string
Execute the original command as requested by the user
Sleep for a specified period of time and ask again
Substitute the command-line arguments with new ones
Kill the parent process Instructions can also be packaged as a string, with one or two fields separated by a space. The first field contains an opcode indicating which response the wrapper should provide, and the optional second field contains additional information about the response. Table 3 provides detailed description of example instructions.

TABLE 3

| Action | Opcode (OP) | Additional Information |
|---|---|---|
| Run the original command on another system. | OP < −256 | N/A |
| Fail and print the specified error string. | −255 OP < 0 | Error string to be printed |
| Execute the original command as requested. | 0 | N/A |
| Sleep for the specified time and then ask again. | 1 | Number of seconds to sleep before contacting the Decision Maker again |
| Substitute the command-line arguments with the specified ones. | 2 | New command-line arguments to substitute for the original ones |
| Kill the parent process. | 255 | N/A |

In further example embodiments, the wrapper program resides in user space, and retains the permissions associated with the user's original call. Further modifications to the kernel can also be made in order to hide the wrapper program from execution traces.

Because the wrapper program runs on every program execution, it can optionally provide application level auditing. It can generate log files containing all programs executed on the system, the arguments they were called with, and the ID of the user who invoked them. These logs can contribute both to the Decision Maker's intrusion detection process and its decision about how to respond to the user's request.

Example Protection System Architecture

According to further specific embodiments, the invention can be embodied in a fully function system to address the insider threat. An example of such system follows a three-step process: (1) Detect malicious users; (2) Decide what to do about it; (3) Respond to the malicious user.

Detecting malicious users

A number of different mechanisms can be used to identify malicious users according to specific embodiments of the invention. In one example, a keystroke analyzer is used either alone or as one of several different anomaly detection components to detect attackers.

Once a user has been flagged as malicious, a decision maker decides when to activate deception and which deceptive response should be returned. A response mechanism then responds to the attacker as instructed by the Decision Maker.

According to specific embodiments of the invention, when a user is first identified as a possible intruder, he is exposed to a small set of deceptions. As the user's behavior continues to generate anomalies, the system gains confidence that the flagged user has malicious intent, and the deception mechanisms hide an increasing amount of the actual environment and disable an increasing amount of his privileges. This allows the defenders to gain information about the attacker's goal while keeping him from damaging the system. The defenders also gain extra time to discover the attacker's real identity (in the case of a masquerader) and decide how to respond to the attack (e.g., kick the attacker off, call FBI, etc.).

Figure 9:
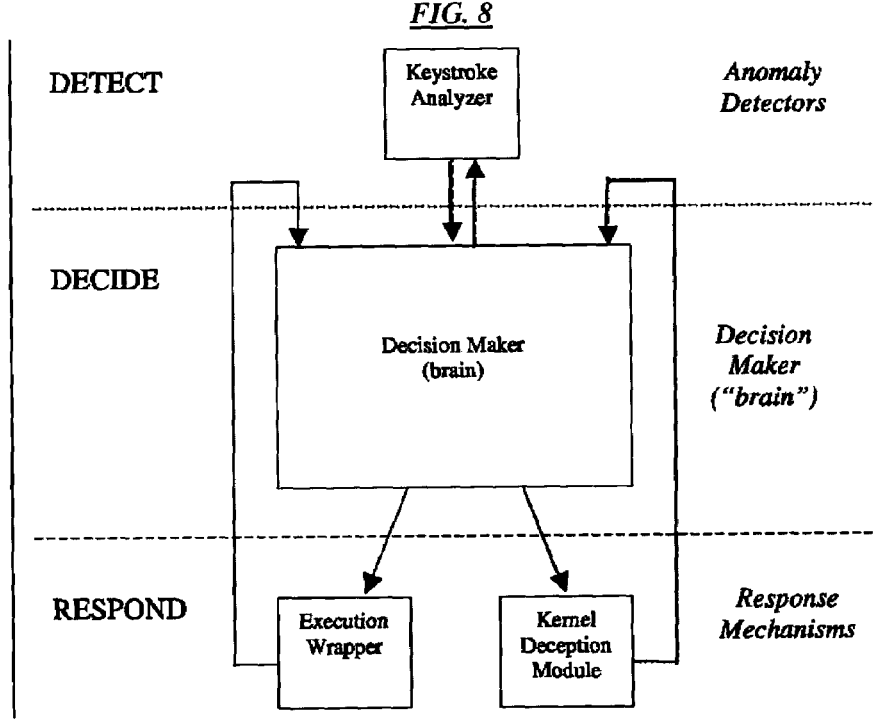
FIG. 9 is a block diagram showing an example organization of a deception system according to specific embodiments of the invention.

One example architecture of a protection system according to specific embodiments of the invention is depicted in FIG. 9. The invention according to specific embodiments can be used along with any number of different anomaly detection logic modules and/or systems. For example, a classic anomaly detector, such as NIDES, maintains statistical profiles of normal user behavior, and raises an alarm when a user deviates too far from his profile. Further information about various implementations of such detectors are available at www.s-dl.sri.com/projects/nides/index5.html. An alternative type of anomaly detector that can be used according to specific embodiments of the invention is a keystroke analyzer. A keystroke analyzer identifies people based on the timing of their keystrokes. It stores this timing information for each user, using it to determine whether or not the person typing is a masquerader.

The anomaly detectors report abnormal behavior to the Decision Maker, which has two duties: triggering deception and deciding how to respond to the user. The Decision Maker decides whether or not to turn deception on for a particular user based on the information it has received from the anomaly detectors. The Decision Maker then decides what response the deception mechanisms should send to the user, and communicates its decision to the response mechanisms.

The response mechanisms provide system responses as instructed by the Decision Maker. The Kernel Deception Module provides deceptive responses by intercepting system calls in the operating system kernel as further described herein. The Execution Wrapper wraps program execution through a change in the execution system call, and can modify system responses to user commands as further described herein. Both mechanisms can also provide information about user actions to the Decision Maker.

Decision Maker

An example Decision Maker can be understood as serving two purposes: deciding when to trigger deception for a particular user, and deciding how the response mechanisms should respond to the user. If the Decision Maker decides against triggering deception, it will instruct the response mechanisms to return the system's responses to the user unaltered. On the other hand, if deception is triggered, the Decision Maker determines what deception the response mechanisms should return.

According to specific embodiments of the invention, a Decision Maker can be configured to instruct the response mechanisms to respond in specific ways, with possible responses as discussed herein. By default, according to specific embodiments, the decision maker instructs the response mechanisms to respond by denying suspicious requests and returning a designated phony error message. As the suspect user continues to misbehave, more of his requests are rejected in this manner, gradually reducing his privileges on the machine.

Decisions Based on Command Classification, Mood Level, and History

According to specific embodiments of the invention, a Decision Maker can have two or more different "mood levels" that correspond to different levels of deception. These moods are determined by the behavior of the user. Generally, the more a user misbehaves, the lower the mood level, and the more thorough the deception. Mood judgment generally is based on the types of commands as well as the order in which they are executed.

Thus, in specific embodiments, an appropriate error message is determined by the current command as well as by the user's history and the Decision Maker's mood level. Commands are classified according to two separate category schemata. Each command is placed into a logical category based on what the command is supposed to do and into to a "behavior" category based on how the execution of this command reflects the user's behavior.

Commands are generally defined to be in one of the following behavior categories: "allowed", "questionable", or "bad". Bad commands are never permitted to execute. Questionable commands are permitted to execute until the Decision Maker's mood reaches level −4. Allowed commands are permitted until the level −10 is reached. At −10 or lower, no commands are executed. At certain levels specific categories of commands might be disallowed regardless of what classification they fall under. This classification can be done either globally or on a per-user basis.

The "logical" classification" places commands into one or more of the following categories:
    Text output
    File modification
    System info output
    Logging in/out of the system
    Shell
    Removable media/devices
    Linking
    Network
    Kernel/kernel modules
    XWindows
    Others
    Changing ownership/permissions
    Stalling/shutdown
    Process initialization This type of classification is done so that the errors the Decision Maker chooses are appropriate for the commands in question. The logical classification also allows for the simulation of more global problems with the computer. For example, if one command elicits the error message about lack of memory, all other commands whose execution might require additional memory will return with the same message. This example form of categorization is limited but has proved sufficient for testing purposes. Various other forms of categorization can be used according to specific embodiments of the invention.

In an example implementation, executing a "bad" command brings the Decision Maker's mood level down by 3; executing a "questionable" command brings it down by 1. The decisions as to what to allow at different mood levels of the Decision Maker are somewhat arbitrary and can be modified in different protection systems. Mappings for the allowed actions at each level in an example embodiment are as listed below:
    Levels 0-(−3): "bad" commands
    Levels −4, −5: "questionable" commands
    Level −6: all "file modification" commands
    Level −7: all "shell" commands Level −8, −9: all "text output" commands Level −10: all commands At levels lower than −10 only the error output is modified. In a specific example implementation, mood levels −4, −10 and −14 are defined to be critical. At level −4 all commands predetermined to be questionable are prevented from executing. Once level −10 is reached, it becomes impossible for the Decision Maker to revert to better moods and once at level −14, a warning that the intruder has been detected is given. In specific embodiments, the mood level also affects the ease with which the Decision Maker can recover and deceptions can be turned off. The mood can be raised one level by executing a specified number of consecutive "allowed" commands:

Levels −3 to −1: 2 commands

Levels −4 to −5: 3 commands

Levels −6 to −7: 4 commands

Level −8: 5 commands

Level −9: 7 commands

Level −10: n/a

The Decision Maker can also be set up to work in different modes. For testing purposes, at this point the modes are set to "normal" and "obnoxious". In the "normal" mode the designated error messages are the regular Linux error messages. In the "obnoxious" mode, the error messages are substituted with made up responses such as "Illegal byte sequence. What were you thinking?" The Decision Maker switches to the "obnoxious" mode after the mood level drops to −16.

Decisions Based on Process Lineage

Figure 10:
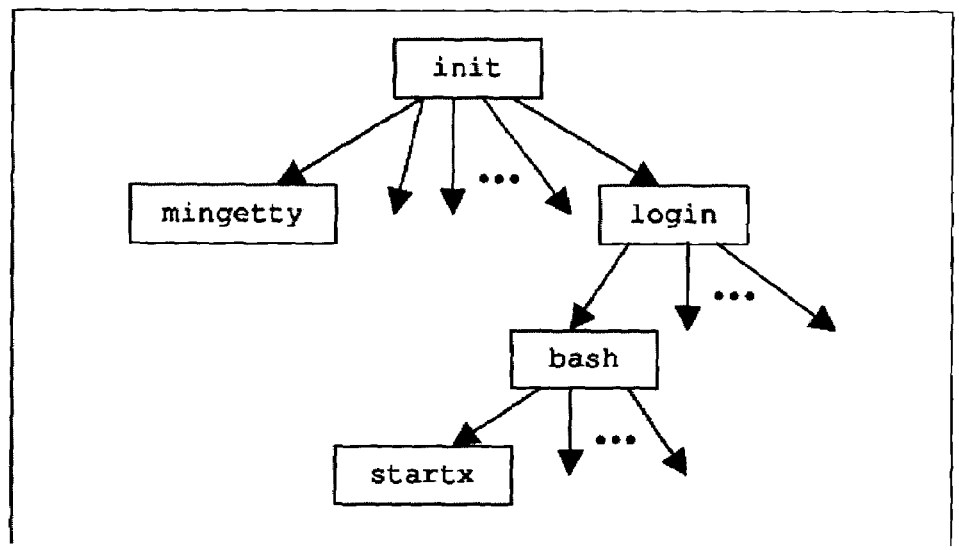
FIG. 10 is a block diagram illustrating process lineage analysis according to specific embodiments of the invention.

In addition to decisions based on mood level and command classification, the Decision Maker can also be configured to make decisions based on process lineage. A process's lineage consists of itself, its parent, its parent's parent, its parent's parent's parent, and so on, up to the root of the process hierarchy (init on UNIX systems). FIG. 10 is a block diagram illustrating process lineage analysis according to specific embodiments of the invention. For example, in the process hierarchy depicted in FIG. 10, the process lineage for startx is (startx, bash, login, init).

According to specific embodiments of the invention, attempting a command whose process lineage does not match a specification or set of rules can be used to affect the overall mood of the brain. The options can be set as follows:

Entire lineage must match a specified lineage exactly

Parent (preceding command) must match a specified command exactly

The specified commands must be a subsequence of the lineage of the current command The specified commands must appear somewhere in the lineage of the current command The lineage of the current command cannot exceed specified depth The specified commands should not be in the lineage The current command's lineage should match any of the specified lineages up to a given depth As with other features, these options can either be turned on globally or on a per user basis.

Example Implementation

In one example implementation, a Decision Maker is a LISP process that runs constantly in the background. It communicates with the response mechanisms via inter-process communication. To cause the sudden increase in error messages as the mood begins to decrease less obvious, an element of randomness can be introduced according to specific embodiments of the invention. For example, every once in a while (e.g., 1/1000 chance), the Decision Maker will tell the wrapper to print out an error message no matter what mood the Decision Maker is in or what type of command it is. The idea is that after seeing occasional errors that led nowhere throughout their work experience with the computer, once the mood level begins to go down, the user will, at least initially, attribute the errors to the usual quirkiness of their machine.

Further Decision Maker Examples

Figure 11:
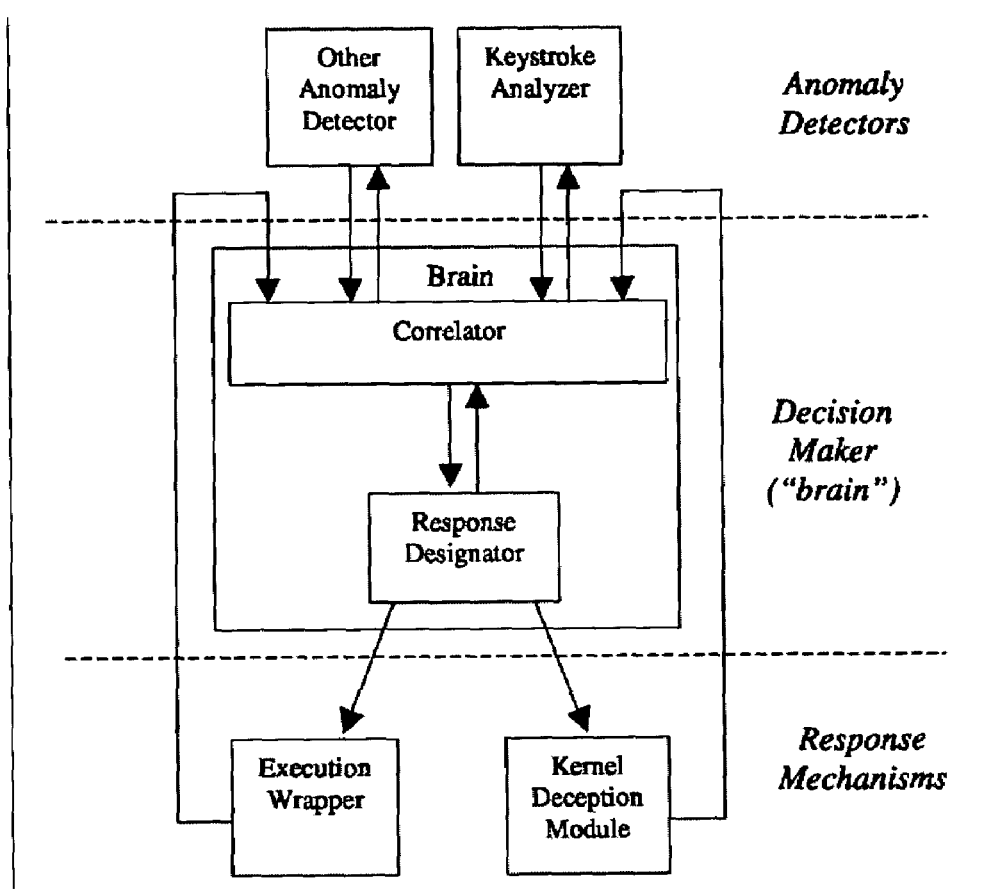
FIG. 11 illustrates an alternative architecture for a deception system according to specific embodiments of the invention.

In order to provide more consistent and thorough deceptions, the Decision Maker is split into two modules: the Correlator and the Response Designator. The Correlator provides a common interface for receiving intrusion detection information from multiple anomaly detection components. It then decides whether or not to trigger deception by correlating the information it has received from the anomaly detectors, and sends its decision to the Response Designator. The Response Designator decides what response the deception mechanisms should send to the user, communicating with the Correlator when it needs more information about a user. FIG. 11 illustrates an alternative architecture for a deception system according to specific embodiments of the invention.

Embodiment in a Programmed Digital Apparatus

The invention may be embodied in a fixed media or transmissible program component containing logic instructions and/or data that when loaded into an appropriately configured computing device cause that device to perform in accordance with the invention.

Figure 12:
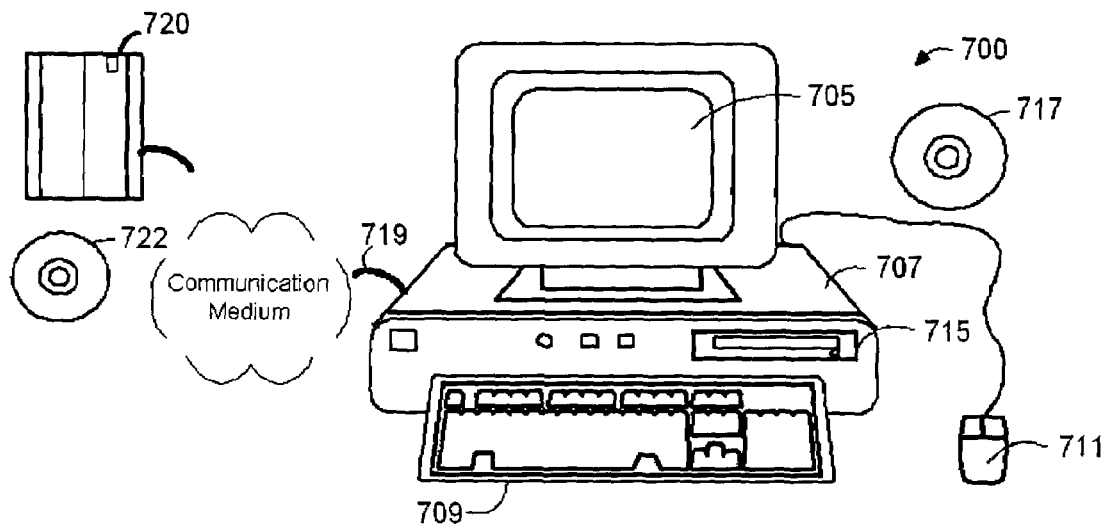
FIG. 12 illustrates an example logic or information handling device in which aspects of the present invention may be embodied.

FIG. 12 illustrates an example logic or information handling device in which aspects of the present invention may be embodied. FIG. 12 shows digital device 700 that may be understood as a logical apparatus that can read instructions from media 717 and/or network port 719. Apparatus 700 can thereafter use those instructions to direct a method of image interpolation. One type of logical apparatus that may embody the invention is a computer system as illustrated in 700, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

The invention also may be embodied within the circuitry of an application specific integrated circuit (ASIC) or a programmable logic device (PLD). In such a case, the invention may be embodied in a computer understandable descriptor language which may be used to create an ASIC or PLD that operates as herein described.

The invention also may be embodied within the circuitry or logic processes of other digital apparatus, such as cameras, displays, image editing equipment, etc.

CONCLUSION

The invention has now been explained with regard to specific embodiments. Variations on these embodiments and other embodiments will be apparent to those of skill in the art. The invention therefore should not be limited except as provided in the attached claims. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed:

1. A method of operating an information appliance comprising:
   receive a logic request at an operating system;
   determine if a deception should be provided by the operating system;
   if yes, do one or more of:
      perform a deception action;
      provide a deception response;
      fulfill said logic request;
   if no fulfill the request normally.

2. A method of operating an information appliance comprising:
   receive a logic request at an operating system;
   determine if communication with external logic is desired;
   if yes:
      using external logic, determine if deception will be performed by the operating system;
      using external logic, decide what deception is to be performed;
      perform a deception action;
      optionally provide a deception response;
      optionally fulfill said logic request action;
   if no:
      evaluate and fulfill said logic request.

3. A computer program product for use in an information system comprising:
   a computer useable fixed medium having computer readable program code embodied therein, said computer program product further comprising:
   computer readable program code enabling a loadable kernel module able to intercept system calls;
   wherein said kernel module, after intercepting a system call, grants, refuses to grant, or falsifies granting or refusing said system call depending on one or more parameters of a system call and/or an entity making said system call; and
   wherein said kernel module, after intercepting a system call, returns either an accurate or an inaccurate response to said system call depending on one or more parameters of a system call and/or an entity making said system call.

4. The computer program product of claim 3 further wherein:
   said kernel module comprising a control module and one or more decision modules.

5. The computer program product of claim 3 further wherein:
   said kernel module can selectively return false responses in response to system calls.

6. The computer program product of claim 3 further wherein:
   said kernel module can probabilistically return false responses in response to system calls.

7. The computer program product of claim 3 further comprising:
   computer readable program code that when loaded into an appropriately configured information system provides a control mechanism able to identify, mark, and control deceptions provided in response to system calls.

8. The computer program product of claim 3 further wherein:
   said kernel module intercepts all system calls.

9. The computer program product of claim 3 further wherein:
   said kernel module intercepts one or more system calls analogous to:

open( );
   read( );
   chdir( );
   stat64( );
   lstat64( );
   setuid( );
   setgid( );
   setgroups32( );
   getdents64( );
   write( );
   unlink( );
   rmdir( );
   getuid32( );
   getgid32( );
   geteuid32( );
   getegid32( );
   getgroups32( );
   chmod( );
   rename( );
   mkdir( );
   delete_module( ); or
   socketcall( ).

10. The computer program product of claim 3 further wherein:
    said control module intercepts four or more system calls analogous to:

open( );
   read( );
   chdir( );
   stat64( );
   lstat64( );
   setuid( );
   setgid( );
   setgroups32( );
   getdents64( );
   write( );
   unlink( );
   rmdir( );
   getuid32( );
   getgid32( );
   geteuid32( );
   getegid32( );
   getgroups32( );
   chmod( );
   rename( );
   mkdir( );
   delete_module( ); or
   socketcall( ).

11. The computer program product of claim 3 further comprising:
    a user space interface allowing changes in deception behavior to be made while said kernel module is inserted.

12. The computer program product of claim 3 further comprising:
    a module able to simulate/proc filesystem type system call.

13. The computer program product of claim 3 further wherein said control module can transparently cause deceived processes to access different storage and processing areas or systems during a system call.

14. The computer program product of claim 3 further wherein said control module can hide module listings so that said control module does not appear when a lsmod type call is executed.

15. An information processing system comprising logic processing apparatus and operating system central logic comprising:

a caller identifier able to indicate calling entities for deception;

one or more system calls able to set said caller identifier to mark a calling entity for deception; and one or more system calls able to read said caller identifier and able to provide deceptive responses and/or take deceptive actions when called by an entity marked for deception.

16. The system of claim 15 further wherein:

said one or more system calls are able to provide deceptive responses and/or take deceptive actions probabilistically.

17. The system of claim 15 further wherein:

said one or more system calls are able to provide deceptive responses and/or take deceptive actions selectively.

18. The system of claim 15 further wherein:

said one or more system calls evaluate one or more system and/or user parameters in determining whether to or how to selectively provide deceptive responses or take deceptive actions.

19. The system of claim 15 further comprising:

a user space interface allowing changes in deception behavior of one or more system calls to be made during operation of said operating system central logic.

20. A method of modifying operation of an information system comprising:

initiating a requested operating system call;

deciding among three or more possible responses to said system call;

wherein said responses comprise an accurate or an inaccurate response to a system call; and wherein said responses further comprise granting, refusing to grant, or falsifying granting or refusing said system call.

21. The method of claim 20 further wherein said responses further comprise modifying said system call request prior to executing said system call.

22. The method of claim 20 further wherein said responses further comprise undetectably redirecting said system call to be performed in another information processing environment.

23. The method of claim 20 further comprising:

selectively returning false responses to system calls.

24. The method of claim 20 further comprising:

probabilistically returning false responses to system calls.

25. The method of claim 20 further comprising:

identifying, marking, and controlling deceptions provided in response to system calls through a user space interface.

26. The method of claim 20 further comprising:

intercepting all system calls by system call control logic.

27. The method of claim 20 further comprising:

transparently changing deceived processes to access different storage and processing areas or systems during a system call.

28. A method of defending an information processing system from possibly undesired operations comprising:

initiating an operating system call;

deciding among a set of possible responses to said system call; and wherein said set of possible responses comprises accurate and inaccurate responses.

29. A method of defending an information processing system from intentional and/or unintentional destructive operations comprising:

intercepting an operating system call;

deciding among a set of possible responses to said system call; and wherein said set of possible responses comprises granting, refusing to grant, falsifying granting or refusing, and modifying execution of said system call.

30. The method of claim 29 further wherein:

said set of possible responses comprises performing a requested call in a different information processing environment.

31. A method of enhancing security in an information processing comprising:

modifying two or more system calls to identify entities for deception and/or provide deception functions; and providing deceptions from a system call to an entity identified for deception.

* * * * *